(12) United States Patent
Beckert et al.

(10) Patent No.: US 7,051,160 B2
(45) Date of Patent: *May 23, 2006

(54) SOFTWARE MANAGEMENT SYSTEMS AND METHODS FOR AUTOMOTIVE COMPUTING DEVICES

(75) Inventors: Richard D. Beckert, Lake Stevens, WA (US); Sharon Drasnin, Seattle, WA (US); Ronald Otto Radko, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,346

(22) Filed: Oct. 6, 2005

(65) Prior Publication Data

US 2006/0036805 A1 Feb. 16, 2006

Related U.S. Application Data

(63) Continuation of application No. 10/860,880, filed on Jun. 3, 2004, which is a continuation of application No. 09/745,894, filed on Dec. 20, 2000, now Pat. No. 6,801,994.

(51) Int. Cl.
*G06F 12/00* (2006.01)
*G06F 9/445* (2006.01)

(52) U.S. Cl. .................. 711/133; 711/103; 711/104; 711/105; 711/206; 711/207; 711/135; 713/2

(58) Field of Classification Search .................. None
See application file for complete search history.

(56) References Cited

U.S. PATENT DOCUMENTS

| | | | |
|---|---|---|---|
| 5,119,483 A | 6/1992 | Madden et al. | |
| 5,519,853 A | 5/1996 | Moran et al. | |
| 5,581,464 A | 12/1996 | Woll et al. | |
| 5,680,570 A | 10/1997 | Rantala et al. | |
| 5,696,917 A | 12/1997 | Mills et al. | |
| 5,930,816 A | 7/1999 | Fujita | |
| 6,021,470 A | 2/2000 | Frank et al. | |
| 6,092,172 A | 7/2000 | Nishimoto et al. | |
| 6,272,598 B1 | 8/2001 | Arlitt et al. | |

FOREIGN PATENT DOCUMENTS

| | | |
|---|---|---|
| JP | 09063179 A | 3/1997 |
| JP | 2000122929 A | 4/2000 |

OTHER PUBLICATIONS

Zhou et al., "Fast Cluster Failover Using Virtual Memory-Mapped Communication," Conference Proceedings of the 1999 International Conference on Supecomputing, Jun. 1999, Rhodes Greece, pp. 373-382.

*Primary Examiner*—Reginald G. Bragdon
(74) *Attorney, Agent, or Firm*—Lee & Hayes, PLLC

(57) ABSTRACT

Methods and systems for operating automotive computing devices are described. In one embodiment, an automotive computing device is provided having a processor, volatile memory, non-volatile memory, and SRAM. An object store is provided for the computing device in the non-volatile memory. One or more pages from the object store are maintained in the SRAM.

20 Claims, 17 Drawing Sheets

Handling Object Store Page Exception

| Exception Type | Current Access for OS page | Current Location of OS page | Action | Additional Notes |
|---|---|---|---|---|
| Write | Write | SRAM | No special action is required. This is a normal TLB miss. OS page table information must be fetched and stored inside the TLB. No interaction with the SRAM object store page table is required | Since the TLB has a limited number of entries, repeated page table misses can happen often |
| Read | Read | DRAM or SRAM | No special action is required. This is a normal TLB miss. OS page table information must be fetched and stored inside the TLB. No interaction with the SRAM object store page table is required | Since the TLB has a limited number of entries, repeated page table misses can happen often |
| Read | Read | Flash | (1) Copy the page into DRAM at physical address specified in the OS page table. (The faulting virtual address is used as a key into the OS page table in which the corresponding physical address is stored).<br><br>(2) Modify the OS page table and TLB permissions for read-only accesses.<br><br>(3) Copy the M bits to the F bits in order to specify where the page is located in flash in case of power loss. Modify the L bits to indicate that the page is now in DRAM.<br><br>(4) Modify the SRAM object store page table M bits to specify the physical address in DRAM. | The access bits are changed to read only so that an attempt to write to the page will cause a write exception. In this exception handler, the page can be copied to SRAM before writing to it (thus making it dirty). |

Fig.12A

| Exception Type | Current Access for OS page | Current Location of OS page | Action | Additional Notes |
|---|---|---|---|---|
| Write or Read/write | Read | Flash | (1) Copy the page into SRAM at an available page slot.<br>(2) Update the OS page table and the TLB physical address values to the page's address in SRAM.<br>(3) Modify the OS page table and the TLB permissions for the access desired.<br>(4) Modify the SRAM object store page table M bits to specify the physical address in SRAM. Modify the L bits to indicate that the page is now in SRAM.<br>(5) Modify the SRAM page table, TLB, and OS page table access bits for the desired access. | The access bits are changed to read only so that an attempt to write to the page will cause a write exception. In this exception handler, the page can be copied to SRAM before writing to it (thus making it dirty). |
| Write or Read/write | Read | DRAM | See directly above | See directly above |

Fig. 12 B

SOFTWARE MANAGEMENT SYSTEMS AND METHODS FOR AUTOMOTIVE COMPUTING DEVICES

RELATED APPLICATION

This is a continuation application of and claims priority to U.S. patent application Ser. No. 10/860,880 filed Jun. 3, 2004 which, in turn, is a continuation application of and claims priority to U.S. patent application Ser. No. 09/745,894, filed Dec. 20, 2000 now U.S. Pat. No. 6,801,994 the disclosures of which are incorporated by reference herein.

BACKGROUND

Automobiles are becoming increasingly popular platforms on which to provide computing devices. One popular computing device in the automotive space is Microsoft's Auto PC. Powered by the Microsoft Windows CE® operating system, the Auto PC is Microsoft's in-car entertainment and information platform technology. Hardware versions of the Auto PC platform can fit into most automobile dashboards, have color LCD screens, high-powered AM/FM stereos, and CD-ROM drives. The inclusion of the CD-ROM drive allows users to access vast stores of data on their Auto PC. The Auto PC is ideally an extensible platform which can be built upon to provide added applications and functionality for the user. For example, applications can be provided that enable drivers to use voice commands to check e-mail and schedules, find phone numbers, make calls on their car phones and get news and other information. The Auto PC can include applications that permit wireless Internet access for the purpose of searching and retrieving information over the Web. The Auto PC platform provides a platform for a seemingly endless number of user applications that can greatly enhance the user's experience.

There are challenges, however, associated with providing computing devices such as the Auto PC in automobiles.

In automobiles using Windows CE® or any other type of operating system, there is typically critical data that the system uses which is usually stored in so-called working RAM (i.e. volatile dynamic random access memory) for speed of access. This critical data can include application data (e.g. navigation data, address book data, third party installed applications and the like). Dynamic random access memory has to be constantly refreshed or the data that it contains will be lost. If the power is lost, the DRAM cannot be refreshed and, hence, any critical data that it contains is lost.

Current Windows CE® implementations, as well as other implementations, use a small cell back-up battery that is used to back up the entire DRAM when the system goes in a standby mode associated with, for example, a power loss. For automotive requirements (such as Auto PC and the like), there are a number of problems with this solution. Typically, the batteries that are used for backup purposes do not meet automotive specifications. For example, the temperature ranges at which the batteries work are not suitable for the temperature ranges typically encountered by automobiles. Additionally, automotive manufacturers or original equipment manufacturers (OEMs) do not want consumers to have to go to the burden of replacing the backup batteries when they eventually fail. The backup batteries, such as those produced by Tadiran, which do meet automotive requirements are limited to a few microamps of current draw if the non-rechargable battery is to last the life of the product without replacement.

FIG. 1 shows a portion of a storage system of a typical automotive computer generally at 10 that includes non-volatile storage 12 and DRAM 14 coupled together by a bus 16. Exemplary non-volatile storage can include flash memory or $E^2$ memory. This type of memory does not need to be refreshed and can retain its data in the event of a loss of power. DRAM, as pointed out above, needs to be constantly refreshed. When the automobile's computer system is booted, its object store (i.e. database, the file system, and the registry) is typically copied from non-volatile storage 12 into DRAM 14. When the automobile's computer system enters zero power mode, eliminating any drain on the car's main battery, the entire contents of DRAM 14 are written back into the non-volatile storage 12. This ensures that the data is preserved and can be written into DRAM the next time that the system is booted up. The automobile's computer system may go to a standby state drawing only a few milliamps (DRAM in self-refresh state) for some time, perhaps a few days, as determined by the OEMs before entering zero power mode.

This solution works well as long as the system shut down to zero power mode is an orderly one that is known in advance. Specifically, consider the case where non-volatile storage 12 is implemented as flash memory. In that case, the volatile data stored in DRAM (data that needs to be preserved across power cycles) is written into the flash memory as a copy operation. This operation can take about 90 seconds to complete. In the context of an automotive computing device, it is often not possible to know ahead of time that the power is going to be abruptly lost. For example, on a cold day in an automobile with a marginal battery, when the car is started, the starter can drop the voltage out of regulation instantaneously. In that case, power loss is instantaneous and any data in DRAM will be lost.

One possible solution to the problem of an abrupt power loss involves using a capacitor in conjunction with the voltage supply to provide a decay of the supply voltage in the event of an abrupt power loss. This solution is not optimal or even desirable because the extra time that is provided for copying data from DRAM to flash is entirely inadequate. For example, assuming 3 A at 12V, by using a 5000 micro Farad electrolytic capacitor to hold the computer system's input voltage, the supply voltage to the ICs can be held for approximately 12 milliseconds before dropping out of regulation. Since many OEMs don't want to use a capacitor this large, the realistic hold time is probably more on the order of 2 to 10 ms. This amount of time is not adequate to copy all of the necessary data to non-volatile storage. For example, consider that a single erase and write flash operation for writing to one block of NOR flash memory can take on the order of one second. Each flash block can be on the order of 512 bytes to 4K bytes depending on the flash memory. So within the few milliseconds that are provided by the capacitor solution, at most one Kbyte of data will be able to be written. This is not adequate. Additionally, non-volatile storage such as flash memory requires more power when it is written to. Accordingly, this would further increase the capacitor size requirement.

Another possible solution for maintaining the system's critical data in the event of an abrupt power loss is to continuously write the critical data into the flash memory. There are a number of problems with this approach. First, it takes a long time to write to flash memory (i.e. flash memory has to first be erased and then written to). Additionally, flash memory has a limited read/write capability so that if it is being updated continuously, it is going to wear out. Specifically, flash memory and $E^2$ memory have on the order of 100,000–1,000,000 write cycles per block. By constantly writing to flash memory you are eventually going to wear the device out. Finally, it is possible to corrupt the contents of flash if power is lost during a write to it.

Essentially then, the challenges associated with providing automotive computing devices such as the Auto PC can be distilled down to not having enough time to write the critical contents of DRAM into non-volatile memory in the event of an abrupt power shut down. Any proposed solutions to these challenges have to make good business sense in that they have to appreciate and work within the constraints of manufacturers and OEMs that are concerned with not having extra rechargable, user-replaceable batteries to back the memory system.

Accordingly, this invention arose out of concerns associated with providing improved automotive computing devices and methods that adequately address emergency power shut down issues, as well as other issues.

BRIEF DESCRIPTION OF THE DRAWINGS

FIGS. 12A–12B are a table that describes aspects of handling object store page exceptions.

DETAILED DESCRIPTION

Overview

Figure 1:
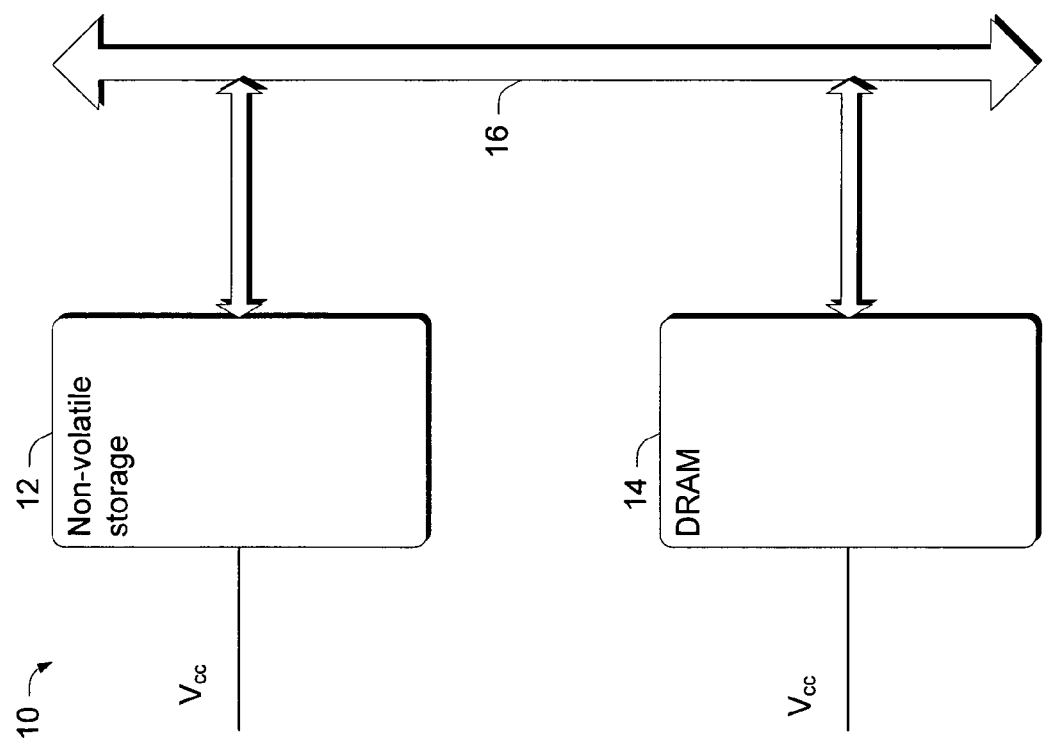
FIG. 1 is a block diagram of an exemplary storage system in an automotive computer.

In accordance with the described embodiments, a cost-effective solution to data loss problems caused by emergency power shut down in automotive computing devices is provided in the form of a small amount of static RAM (e.g. 128–256K) that is incorporated into a storage assembly that is utilized by the computing devices. The storage assembly thus can contain an amount of non-volatile storage (e.g. flash memory), dynamic random access memory (DRAM or SDRAM), as well as the SRAM. The SRAM is battery-backed by a small lithium cell battery which, together with the SRAM, provides a non-volatile memory space in which critical data can be maintained. Using SRAMs is advantageous because they can be placed in a low power state in which they draw very little current from the backup battery. This, in turn, greatly increases the lifetime (e.g. much longer than 10 yrs) of the automotive computing system to the point that it has exceeded the required operating life of the product. It is conceivable that a 50-year life for the battery can be realized. In addition, SRAM also provides write and read access times similar to those of ordinary DRAM.

Power control circuitry is provided and ensures that the SRAM receives back up power at the appropriate time. In the embodiment described below, the circuitry determines when the supply voltage drops out of regulation and then incorporates the backup power source into a circuit in which it can supply power to the SRAM.

Software is provided that manages the SRAM and the other storage assembly components. The software makes use of virtual paging or virtual addressing techniques to keep track of where various pages, e.g. object store pages, are stored in the system. Through the techniques described below, the system knows exactly where all of the object store pages are stored in the system so that in the event of an abrupt power loss, the data locations are known. The SRAM is advantageously used to maintain so-called "dirty pages" or pages that have been written to. For example, all of the object store pages in the system are initially maintained in non-volatile storage, i.e. flash memory, as "read only" pages. The pages can then read into RAM as they are needed. Just before a page is written to (i.e. changed in some way), that page is moved into the SRAM and the software updates the location of this page through virtual addressing techniques. The locations of all of the object store pages in the system are maintained in SRAM. In the event of an abrupt power failure, the contents of the SRAM (i.e. dirty pages), as well as the locations of all of the object store pages in the system are preserved.

The software also provides an orderly means by which object store pages in the SRAM can be written out to flash memory. By managing the manner in which the pages in SRAM are written out to flash memory, unnecessary flash write operations can be avoided which, in turn, increases the lifetime of the flash memory.

Exemplary Auto PC System

Figure 2:
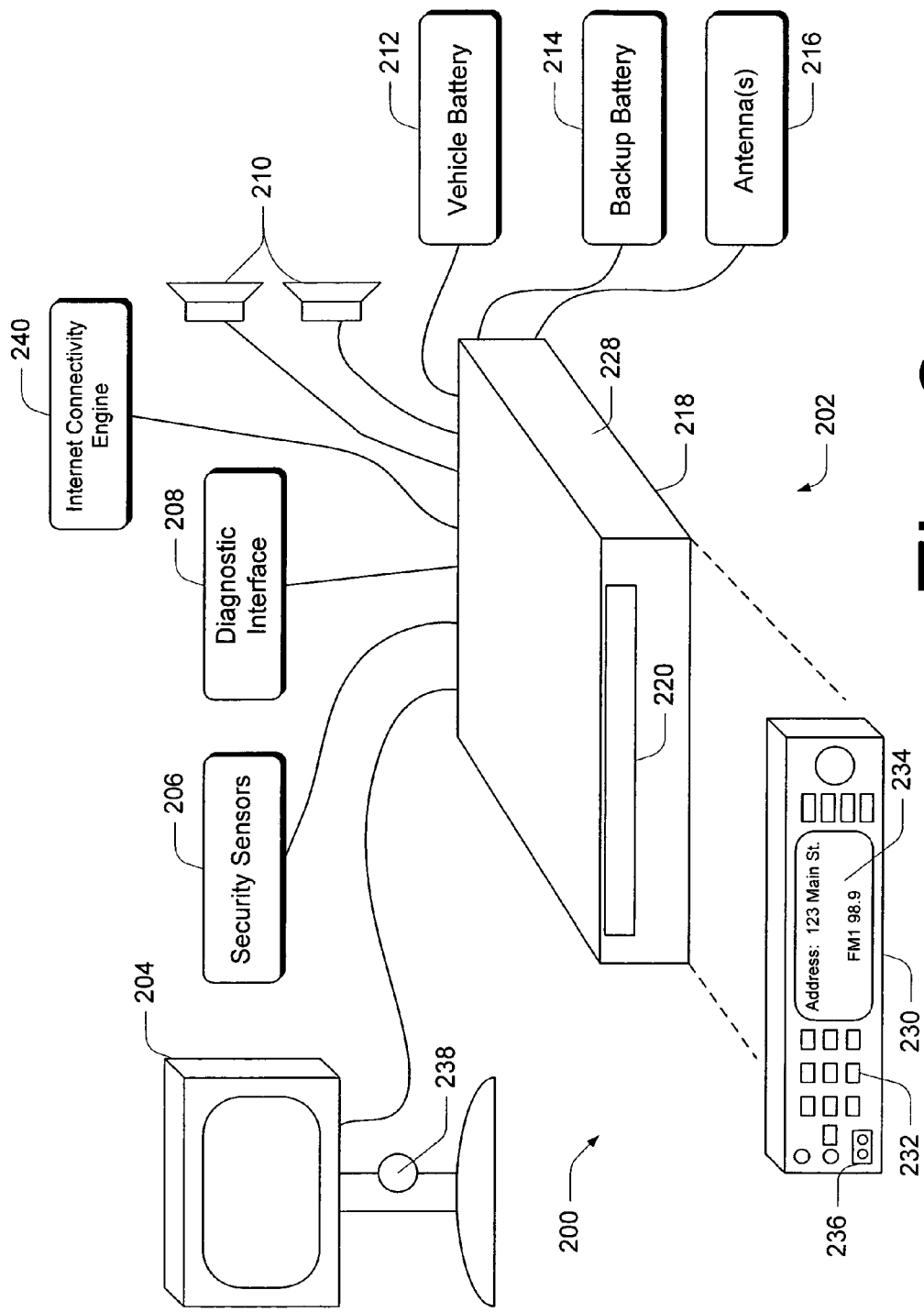
FIG. 2 is a block diagram of an exemplary automotive computing device that is suitable for use in connection with the described embodiments.

FIG. 2 shows an exemplary vehicle (e.g., automobile) computer system or device 200 that can be used in connection with the emergency shut down systems and methods described above and below. System 200 is configured for use in a vehicle such as a car, truck or other similar conveyance. When in place in a vehicle, computer system 200 can provide a multitude of services and applications as will become apparent below.

Vehicle computer system 200 has a centralized computer 202 coupled to various external peripheral devices, including a display device 204, security sensors 206, a vehicle diagnostic interface 208, speakers 210, a vehicle battery 212, a backup battery 214, and antenna(s) 216. The computer 202 is assembled in a housing 218 that is sized to be mounted in a vehicle dashboard, similar to a conventional automobile stereo. In the illustrated example, the housing 218 has a form factor of a single DIN (Deutsche Industry Normen). Alternatively, it could be housed in a 2 DIN unit or other special form factor for an OEM.

The computer 202 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be specially configured for uniquely designed embedded systems. In the illustrated example the open hardware architecture runs a multitasking operating system that employs a graphical user interface. A multitasking operating system allows simultaneous execution of multiple applications. One such operating system is the Windows® brand of operating systems (e.g., the "Windows CE®" operating system) sold by Microsoft Corporation of Redmond, Wash.

The computer 202 can include at least one storage drive which permits the vehicle user to download programs and data from a storage medium. In the illustrated implementation, the computer 202 has a CD ROM (or other optical) drive 220 which reads application-related CDs, as well as musical, video, game, or other types of entertainment CDs. The computer 202 may also include other storage devices, such as a magnetic disk drive, smart card reader, PCMCIA card sockets, a hard disk drive, flash memory, or a DVD ("digital video disk" or "digital versatile disk") drive. In the embodiment described below, non-volatile memory is provided in the form of flash memory. It is to be appreciated and understood that other storage devices can be used without departing from the spirit and scope of the described and claimed subject matter.

The storage drives are mounted in a base unit 228 of the housing 218. The base unit 228 is constructed and sized to be mounted in the dashboard. Optionally, this base unit may be removable in the same fashion as a laptop computer and its associated docking station. This option allows the user to take the vehicle computer to his/her home or office to serve as his/her portable PC. The housing 218 also has a faceplate 230 which is pivotally mounted to the front of the base unit 228 and may optionally be detachable. The faceplate can be rotated to permit easy and convenient access to the storage drives.

The computer 202 has a keypad 232 and a display 234 on the faceplate 230. The operating system executing on the computer 202 controls the faceplate components (keys, IrDA, display, knobs, touch screen, etc.), which, through the computer, can control the faceplate keys 232 and the faceplate display 234 as peripheral devices when the faceplate is attached to the base unit. Additionally, the computer 202 has a voice recognition device to permit the user to verbally enter commands in a hands-free, eyes-free environment. These voice commands can be used for controlling most operating modes of the vehicle computing platform. The computer 202 is also equipped with an IrDA (infrared developers association) transceiver port 236 mounted on the faceplate 230 to transmit and receive data and programs using infrared signals. The entire faceplate unit 230 can behave as a multifunction peripheral to the computing platform.

The computer 202 can output visual data to the LCD 234 at the faceplate, or one or more display devices of the type shown in 204. In the exemplary illustration, display 234 is a back lit LCD and display 204 is a small flat panel display (e.g., 6.4" screen) that is movably mounted on a stand or yoke and remotely located from the computer. Additional display devices may also be added that are similar to display 204 or 234. Different types of display devices may also be added, such as a Heads Up Display (HUD).

The display 204 is fully adjustable to different viewing positions that can be seen by the driver or other passengers in the vehicle. The type of data displayed can range widely from word instructions concerning the vehicle's performance, to diagrammatic directions from a navigation system, to video movies for in-car entertainment. The display 204 can be equipped with a view indicator switch 238. This switch can indicate to the software whether the driver can view the display. Then, depending on whether the car is being driven or not, the software can determine which application content is appropriate to display on the display. When facing the driver, only information supportive and helpful to driving (e.g., diagnostics, navigation directions) is displayed on the monitor, while distracting information (e.g., video movies, games) is blocked from display. In one implementation, the switch is an electrical cylindrical switch which closes when the display is capable of being viewed by the driver; thus, the software can sense the display position and only allow permitted information to be displayed.

In general, the vehicle computer system 200 can be used to integrate multiple vehicle-related systems onto one open platform hardware and software architecture. For instance, the vehicle computer system 200 can serve as a multimedia entertainment system, a navigation system, a communications system, a security system, and a diagnostics system. Moreover, the vehicle computer system 200 provides additional functionality traditionally associated with desk-top and laptop personal computers. For instance, vehicle computer system 200 can support word processing applications, spreadsheet applications, database applications, web browser applications, and appointment/schedule applications. Furthermore, the vehicle computer system 200 can be configured to operate as a server to other computing units in the vehicle to distribute games, video movies, and the like to passengers. Furthermore, the system can include an internet connectivity engine 240 that is configured to establish connectivity with the Internet. This can be done in any suitable way. For example, the internet connectivity engine 240 can wirelessly establish connectivity with the Internet through known wireless techniques.

Information can be displayed on either display device 204 or display 234. The information can be provided by an application running on computer 202, or by a device external to computer 202, such as sensors 206 or via diagnostic interface 208, antenna 216, IrDA port 236, etc. Such information can also be provided to the computer via the internet connectivity engine 240. Information that can be displayed includes any type of data or control information. Additionally, information to be displayed can include a "caption" or "label" that describes the data. Examples of data that can be displayed include street addresses, phone numbers, and directions (e.g., "Turn Left At Light On Main Street"). Such data can be displayed either including a caption describing the data (e.g., "Address: 12345 Washington Street", where "Address:" is the caption portion of the information) or without a caption (e.g., "12345 Washington Street"). Examples of control information include toolbars, menu options, and user-selectable on-screen regions (such as buttons), as well as instructions, headings, and other descriptive information.

In the discussion herein, the various embodiments are described in the general context of computer-executable instructions, such as program modules, being executed by one or more vehicle computers. Generally, program modules include routines, programs, objects, components, data structures, etc. that perform particular tasks or implement particular abstract data types.

Figure 3:
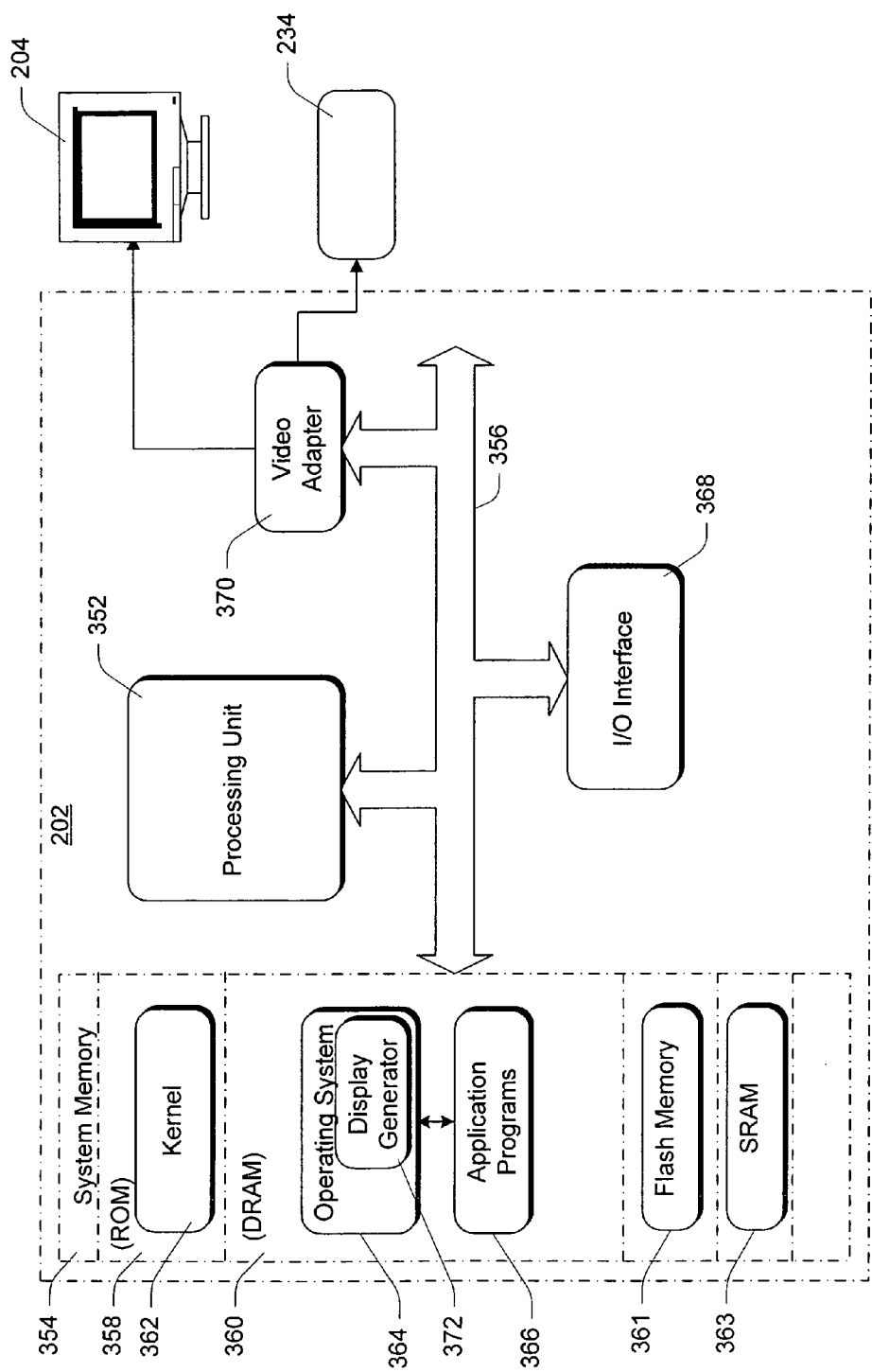
FIG. 3 is a block diagram of a portion of the FIG. 2 computing device.

FIG. 3 shows certain exemplary components of computer 202 of FIG. 2 in more detail. Computer 202 can include one or more processors or processing units 352, a system memory 354, and a bus 356 that couples various system components including the system memory 354 to processors 352.

The bus 356 represents one or more of any of several types of bus structures, including a memory bus or memory controller, a peripheral bus, an accelerated graphics port, and a processor or local bus using any of a variety of bus architectures. The system memory 354 can include read only memory (ROM) 358, dynamic random access memory (DRAM) 360, and non-volatile storage or flash memory 361. In addition, in accordance with the described embodiment, the system memory also includes a small amount of SRAM 363.

A portion of the operating system, such as kernel 362, contains the basic routines that help to transfer information between elements within computer 202, such as during start-up, can be stored in ROM 358 or flash memory 361.

A number of program modules can be stored in ROM 358 or flash memory 361 and transferred into DRAM 360. These include an operating system 364 and one or more application programs 366. A user may enter commands and information into computer 202 through various input devices, such as a keyboard (e.g., keypad 232 of FIG. 2), touchscreen, pointing device, microphone, joystick, game pad, satellite dish, scanner, or the like (not shown in FIG. 3). These and other input devices are coupled to the processing unit 352 through an input/output (I/O) interface 368 that is coupled to the bus 356. A display 204 or 234, or other type of display device, is also connected to the bus 356 via an interface, such as a video adapter(s) 370. Data to be displayed on display 204 or 234 is provided to adapter 370 by a display generator 372 of operating system 364. In addition to the display, computers can include other peripheral output devices (not shown in FIG. 3) such as speakers and printers that are coupled to the processing unit 352 through I/O interface 368.

Generally, the processors of computer 202 are programmed by means of instructions stored at different times in the various computer-readable storage media of the computer. Programs and operating systems are typically distributed, for example, on floppy disks, on PCMCIA cards, or CD-ROMs. From there, they are installed or loaded into the secondary memory of a computer. At execution, they are loaded at least partially into the computer's primary electronic memory.

The embodiments described herein include these and other various types of computer-readable storage media when such media contain instructions or programs for implementing the steps described below in conjunction with a microprocessor or other data processor. The described embodiments also include the computer itself when programmed according to the methods and techniques described below. Furthermore, certain sub-components of the computer may be programmed to perform the functions and steps described below. The described embodiments include such sub-components when they are programmed as described. In addition, the described embodiments include data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Memory System with Power Shutdown Capabilities

Figure 4:
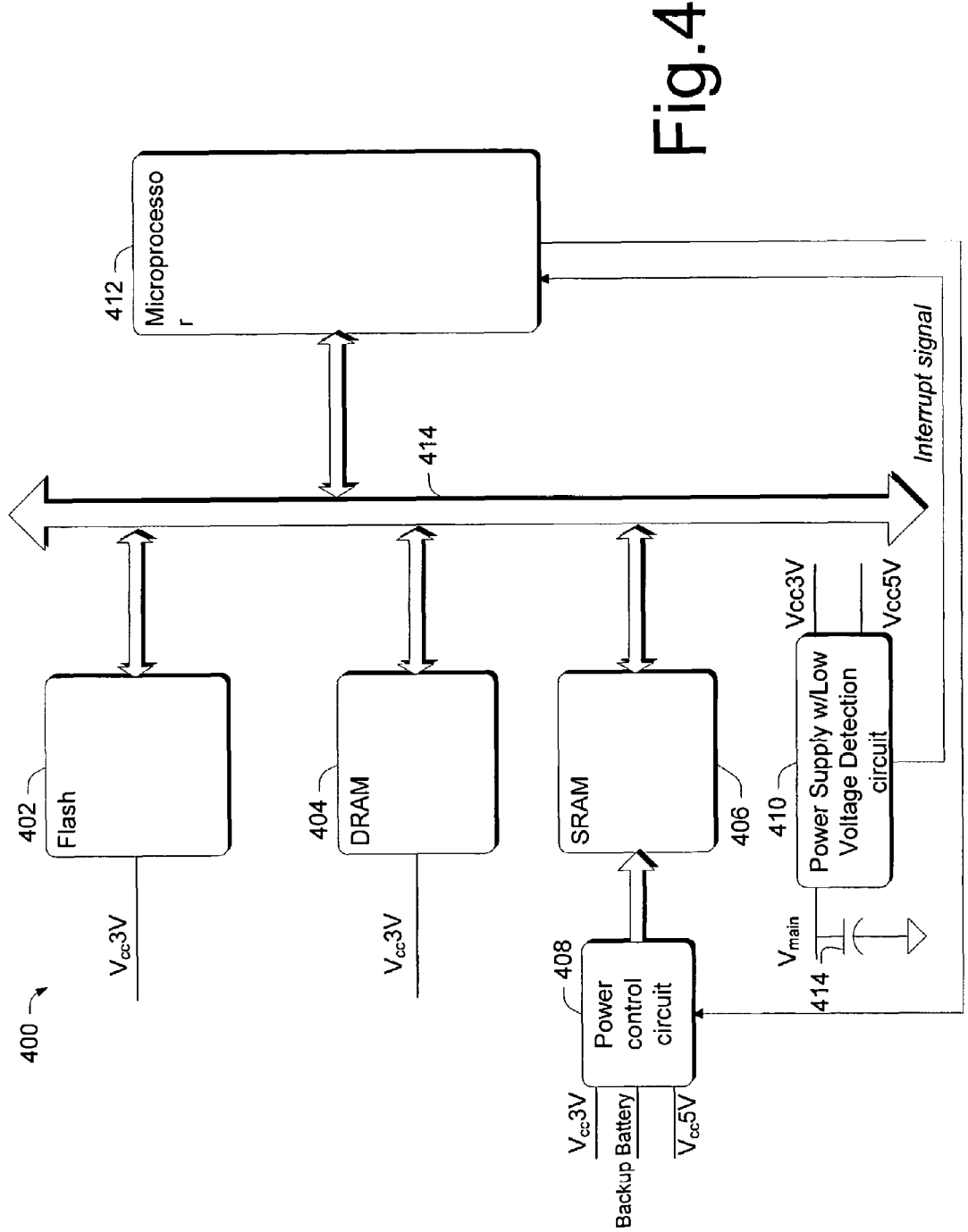
FIG. 4 is a block diagram of exemplary hardware components in accordance with one described embodiment.

FIG. 4 shows an exemplary vehicle computer memory system 400 that is configured with power shut down capabilities in accordance with one described embodiment. System 400 comprises flash memory 402, DRAM 404, SRAM 406, a power control circuit 408, a power supply with low voltage detection circuit 410, a microprocessor 412, and a bus 414.

In the illustrated and described example, the vehicle's object store is maintained in flash memory 402. DRAM 404 is used to contain "read only" pages that are read in from flash memory 402. When the read only pages in DRAM 404 are written to or "dirtied", they are moved into SRAM 406 and maintained there. Low voltage detection circuit 410 is connected to the main voltage supply (i.e. the supply provided by the vehicle's battery). When the low voltage detection circuit 410 detects that the main supply voltage has been abruptly lost or has dipped below a defined voltage level, it generates an interrupt signal that is sent to the microprocessor 412. This notifies the microprocessor that there has been a power failure and enables the microprocessor to take the necessary steps that it needs to take in such an instance. This can include, for example, copying contents in DRAM 404 into SRAM 406. Power control circuit 408 is then activated just as regulated voltage VCC3V begins to drop out of regulation and ensures that a backup battery, in this case a small lithium cell, is incorporated in a circuit so that it can be used to power the SRAM. The power control circuit 408 is also configured to place SRAM 406 in a low power, high impedance state, while isolating the SRAM and the backup battery from the other system components. In the described embodiment, the SRAM is placed into the low power, high impedance state before the backup battery begins to provide power to the SRAM.

The illustrated system can also include a hold capacitor 414 that essentially enables the supply voltage to decay away as a function of the size of the hold capacitor. This provides an extra bit of time (~2–10 milliseconds) for copying any needed data from DRAM 404 to SRAM 406 or for setting any appropriate status information in SRAM 406.

In the illustrated circuit, the flash memory 402, DRAM 404, and SRAM 406 are powered by a 3-volt power rail that is provided by the vehicle's battery through a suitable switcher power supply circuit (not specifically shown).

Timing Considerations

Before continuing on with a discussion of one specific implementation of power control circuit 408 and power supply with low voltage detection circuit 410, the following discussion regarding certain timing considerations is provided so that the reader can more fully appreciate the purpose of the circuitry about to be described.

Figure 5:
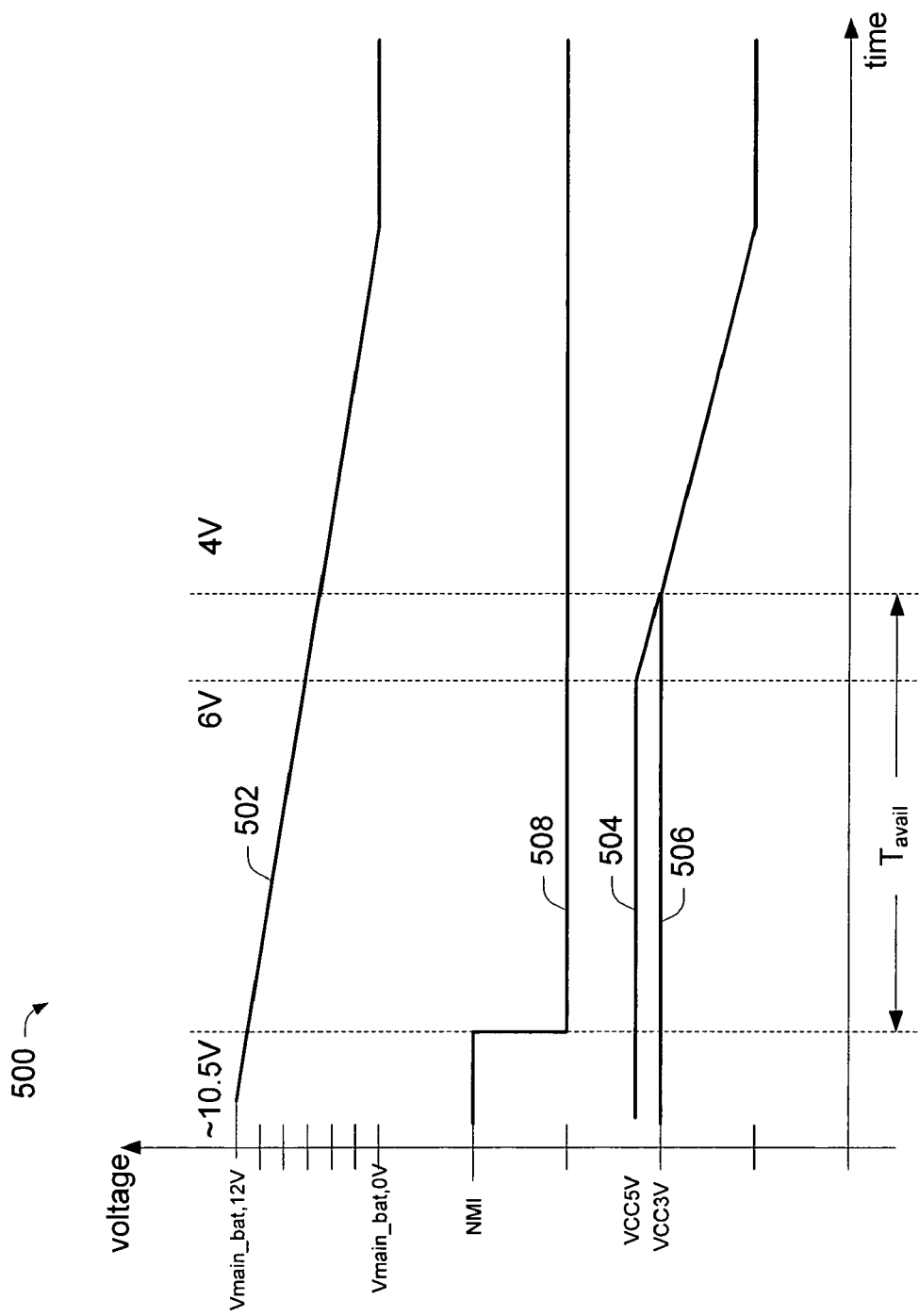
FIG. 5 is a graph or chart that is useful in understanding the operating environment of the described embodiments.

FIG. 5 shows a timing chart 500 that shows various voltages as a function of time in the event of an emergency or abrupt power shut down. In the automotive context, there is a main supply voltage of 12 volts that is provided by the vehicle's battery. This supply voltage is shown at 502. A switching power supply provides 5-volt and 3-volt voltage rails that are used by various systems within the vehicle's computing device. For example, the 3-volt rail is used to power the flash memory 402, DRAM 404 and the SRAM 406. These voltage rails are respectively shown at 504, 506.

An interrupt signal is shown at 508 and constitutes the interrupt signal that is generated by the low voltage detection circuit 410 for microprocessor 412.

The main battery voltage 502 begins to decay as soon as the main battery is removed. Once the main voltage drops below a predetermined threshold (e.g. ~10.5 volts), low voltage detection circuit 410 (FIG. 4) generates an interrupt signal 508 which is a notification to the microprocessor that main power is no longer available. The system software then has a time period designated as $T_{avail}$ to write out any data to the SRAM 406. This $T_{avail}$ is determined by the hold capacitor and typically will range from 2–10 milliseconds depending on the size of the hold capacitor used. The main supply voltage 502 will continue to decay as a function of the hold capacitor. When the supply voltage 502 decays to around 6-volts, the 5-volt power rail is said to drop out of regulation and will start to decay as shown. As the main supply voltage 502 continues to decay, the 3-volt (actually 3.3 volts) power rail will drop out of regulation at around 4-volts. The 3-volt power rail is used by microprocessor 412 and the memory devices (i.e. flash memory 402 and DRAM 404) so they can operate until the 3-volt power rail drops away. The SRAM 406 normally receives its power from the 5V power rail until it drops out of regulation at which point the backup battery takes over.

As the voltage decays as described above, there are essentially two operations that go on in parallel. First, as the voltage starts dropping out of regulation, the SRAM is placed in a low power, high impedance state so that there is no leakage back to the microprocessor. Second, the SRAM's power supply line is isolated from the main power supply rail so that the backup battery does not try to back feed the 5-volt power rail. In the described embodiment, both of these functions are implemented by the power control circuit 408. That is, the power control circuit places the SRAM in its low power, high impedance state, and incorporates and isolates the SRAM's backup battery so that it can power the SRAM.

Figure 6:
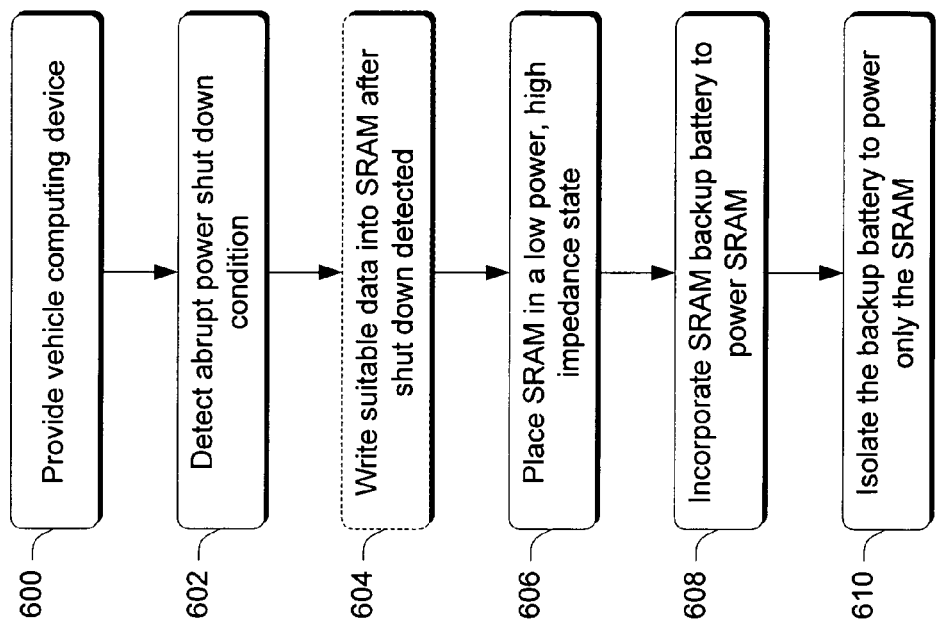
FIG. 6 is a flow diagram that describes steps in a method in accordance with one described embodiment.

FIG. 6 is a flow diagram that describes steps in a method in accordance with one described embodiment. In the illustrated example, the method is implemented in hardware, a specific example of which is given below.

Step 600 provides a vehicle computing device. Exemplary computing devices are described above. One particular type of vehicle computing device is an Auto PC device developed by Microsoft. It is to be appreciated and understood that the inventive techniques described below can be practiced in connection with any suitable vehicle computing device, with the Auto PC constituting but one exemplary device. Step 602 detects an abrupt power shut down condition. An abrupt power shut down condition can occur, for example, when a vehicle's battery is suddenly disconnected or otherwise unavailable for providing power to the vehicle's computing device. In the illustrated example, this step is implemented by a power supply with low voltage detection circuit such as circuit 410 in FIG. 4. It is to be appreciated and understood that any suitable circuit can be used for implementing a power shutdown detection circuit. It is desirable for such a circuit to have characteristics that enable it to detect when a vehicle's main power supply is not available or will not be available in a short time. Step 604 writes suitable data into SRAM after shutdown is detected by step 602. This step is shown in dash lines because it can be an optional step. The data that can be written into the SRAM can be data that is contained in the system's DRAM. Step 606 places the SRAM in a low power, high impedance state for reasons that were mentioned above. In the illustrated and described embodiment, this step is accomplished by power control circuit 408. Any suitable circuit can be used to place the SRAM in a low power, high impedance state, with but one exemplary specific circuitry being shown and described below.

Step 608 incorporates an SRAM backup battery into a circuit that provides power to the SRAM. The SRAM backup battery is desirably one that has a long lifetime so that the user need not worry about changing the battery. One exemplary lithium cell battery suitable for use in automotive environments is made by a company called Tadiran. In the illustrated and described embodiment, this step is implemented by the power control circuit 408, a specific example of which is shown and described below. Step 610 isolates the backup battery to power only the SRAM. Again, this step is implemented in the described embodiment by power control circuit 408.

Exemplary Shutdown Detection Circuit

In the illustrated and described embodiment, the low voltage detection circuit 410 is implemented as a comparator circuit within the power supply switcher circuit.

Figure 7:
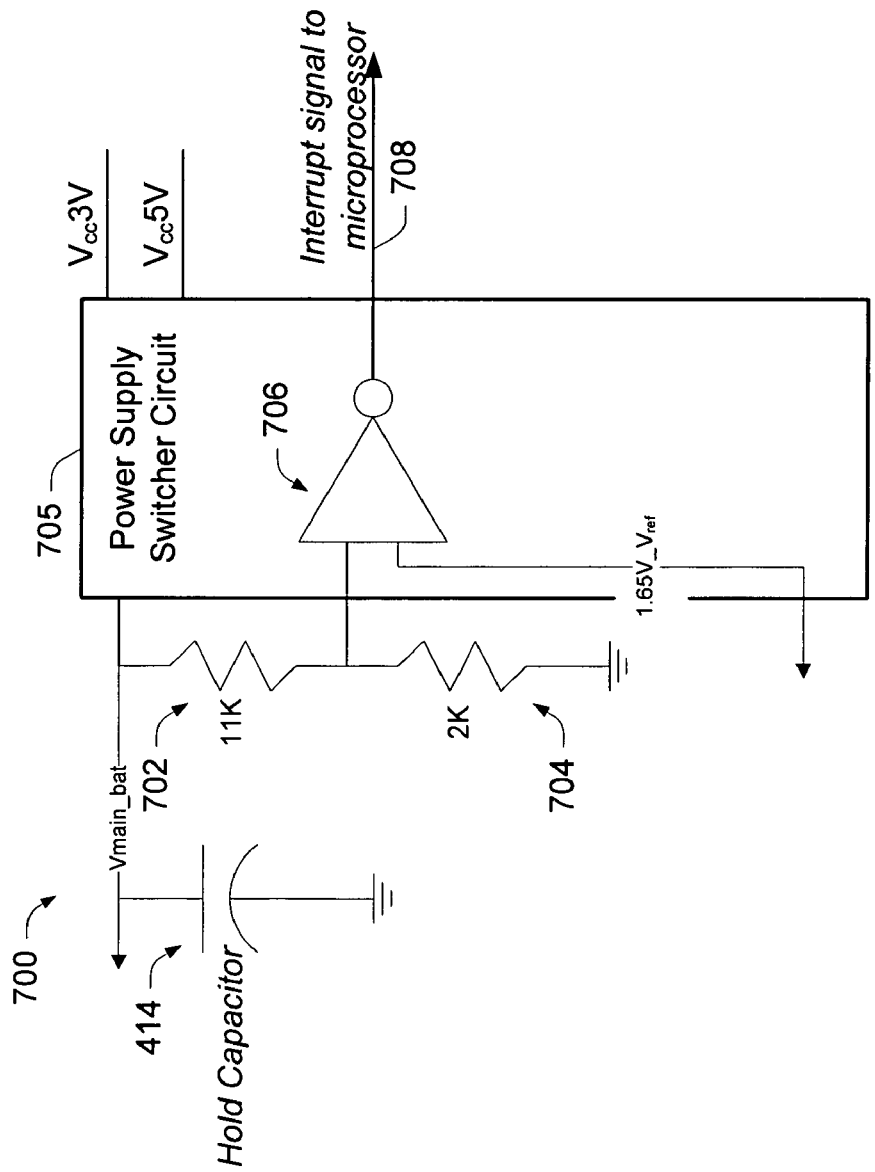
FIG. 7 is a block diagram of one circuit in accordance with one described embodiment.

FIG. 7 shows one exemplary comparator circuit generally at 700 and comprises resistors 702, 704 connected as shown and having the indicated magnitudes. The circuit is connected to the main supply voltage indicated as $V_{main\_bat}$. Hold capacitor 414 is provided as shown. A power supply switcher circuit 705 is provided and is connected to the main supply voltage to generate the 5-volt and 3-volt power rails. A comparator element 706 is provided and includes a voltage reference input (the bottommost of the inputs) and an input derived from the voltage drop across resistor 704. When the input voltage to the comparator element drops below a predetermined nominal voltage, e.g. 1.65V, the comparator circuit trips and generates an interrupt signal (referred to as an "NMI" interrupt for "Non Maskable Interrupt") on line 708 that is provided to the microprocessor. The microprocessor can then immediately copy any unsaved "dirty" pages (if any) or other needed information to SRAM and set any appropriate flags in the SRAM. Depending on the power supply used, when the input voltage drops to around 4V, the 3.3 power rail will begin to drop out of regulation which will cause the DRAM to lose its contents and the microprocessor will stop its functioning.

Exemplary Power Control Circuit

In the described embodiment, by the time the power rail to the SRAM has dropped out of regulation, the power control circuit has advantageously provided a backup battery for the SRAM, and well as isolated the SRAM and its backup battery from the other system components.

Figure 8:
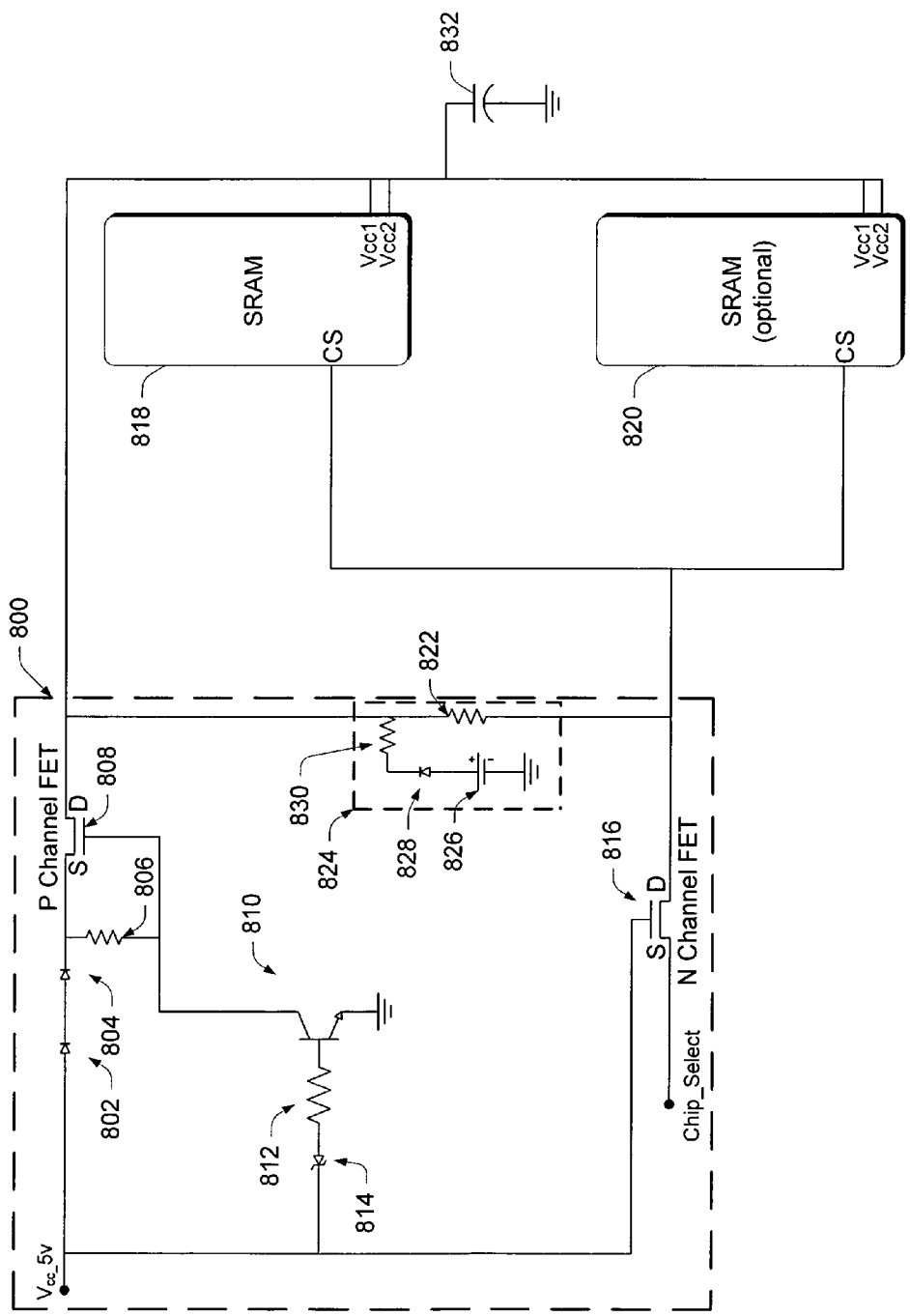
FIG. 8 is a circuit diagram of one circuit in accordance with one described embodiment.

FIG. 8 shows an exemplary power control circuit 800. It is to be appreciated that the described power control circuit constitutes but one example of a suitable power control circuit. In the described embodiment, characteristics of the power control circuit are that it can accomplish one or more of the following functions in the event of an abrupt power loss or shut down: (1) smoothly transition to a backup power source for the SRAM, and (2) suitably isolate the backup power source from the other components in the system so that there is no current flow to the power plane.

Circuit 800 comprises a pair of series-connected diodes 802, 804 connected between the 5-volt power rail and the source of a P-channel field effect transistor (PFET) 808. A 2.2K resistor 806 is connected between (1) a node that is shared with both diode 804 and the source of PFET 808 and (2) the gate of PFET 808. The gate of FET 808 is connected to the collector of a bipolar junction transistor (BJT) 810 whose base is connected to the 5-volt power rail through a 1K resistor 812 and a 3.3V Zener diode 814. An N-channel field effect transistor (NFET) 816 is provided and has its source connected to a chip select line for SRAM 818, and optionally SRAM 820. NFET 816 is essentially a switch on the chip select line the purpose of which will become evident below. The gate of NFET 816 is connected to the 5-volt power rail. A 47K pull up resistor 822 is connected between the drain of NFET 816 and the SRAM $V_{cc}$ line.

A backup power source 824 is provided for the SRAM and comprises a 3.6V lithium cell battery 826, a diode 828 connected to the battery 826, and a 470 Ohm resistor 830 connected between the diode 828 and the SRAM $V_{cc}$ line.

Circuit 800 works as follows: When the 5V power rail is within regulation, BJT 810 saturates thus creating a sufficient gate to source voltage to turn on PFET 808. In this state, the SRAM 818 and optionally SRAM 820 are powered by approximately 3.6V (5V minus two diode drops) on the SRAM $V_{cc}$ line. Advantageously, since this is the same voltage as backup battery 826, no current will flow out of the backup battery because diode 828 will not be forward-biased. Also, diode 828 will block any reverse current from attempting to flow back into or charge the non-rechargable battery 826. It will be appreciated and understood by those of skill in the art that diode 828 could be replaced by a FET to ensure that no current flows through resistor 830 when the 5-volt power rail is within regulation.

When the 5-volt power rail drops well below regulation (i.e. less than about 4V), Zener diode 814 ensures that BJT 810 turns off which, likewise, turns PFET 808 off. With FET 808 turned off, the voltage on the SRAM $V_{cc}$ line will begin to decay as determined by primarily by a capacitor 832. At a slightly higher voltage (~4.5V), NFET 816 will turn off and pull up resistor 822 will pull the chip select line high thus causing the SRAMs to enter into a low power, high impedance state. Thus, as can be seen the SRAM(s) will be in their low power high impedance state before the switch over occurs. In this low power state, the SRAMs draw about 0.5 uA of current. Shortly after the SRAMs are placed into their low power state, battery 826 begins to supply current to the SRAMs. The battery 826 will begin to supply current as the SRAM $V_{cc}$ line drops to approximately 3V. Diodes 802 and 804 also serve to block any reverse current to the power rail (VCC_5V).

Note that in the event 5V is not readily available, a 5V input to the Zener diode 814 and the gate of FET 816 can be provided from the main battery by using a 220 ohm resistor in series with a 5.1V Zener diode.

Although not specifically shown, AND logic can be coupled with the SRAM 818 and optionally SRAM 820 to interface with the microprocessor so that byte write operations can be accomplished in addition word and long word write operations.

Management of the Object Store

In the described embodiment, the object store for the computing device is laid out in virtual memory and accesses to object store pages take place using virtual addresses. By using virtual addresses, pages are not confined to a fixed corresponding physical address in physical memory. Rather, the pages can be moved around within the system quite readily, and are accessed through use of their virtual addresses which can then be mapped to the particular physical location.

Figure 9:
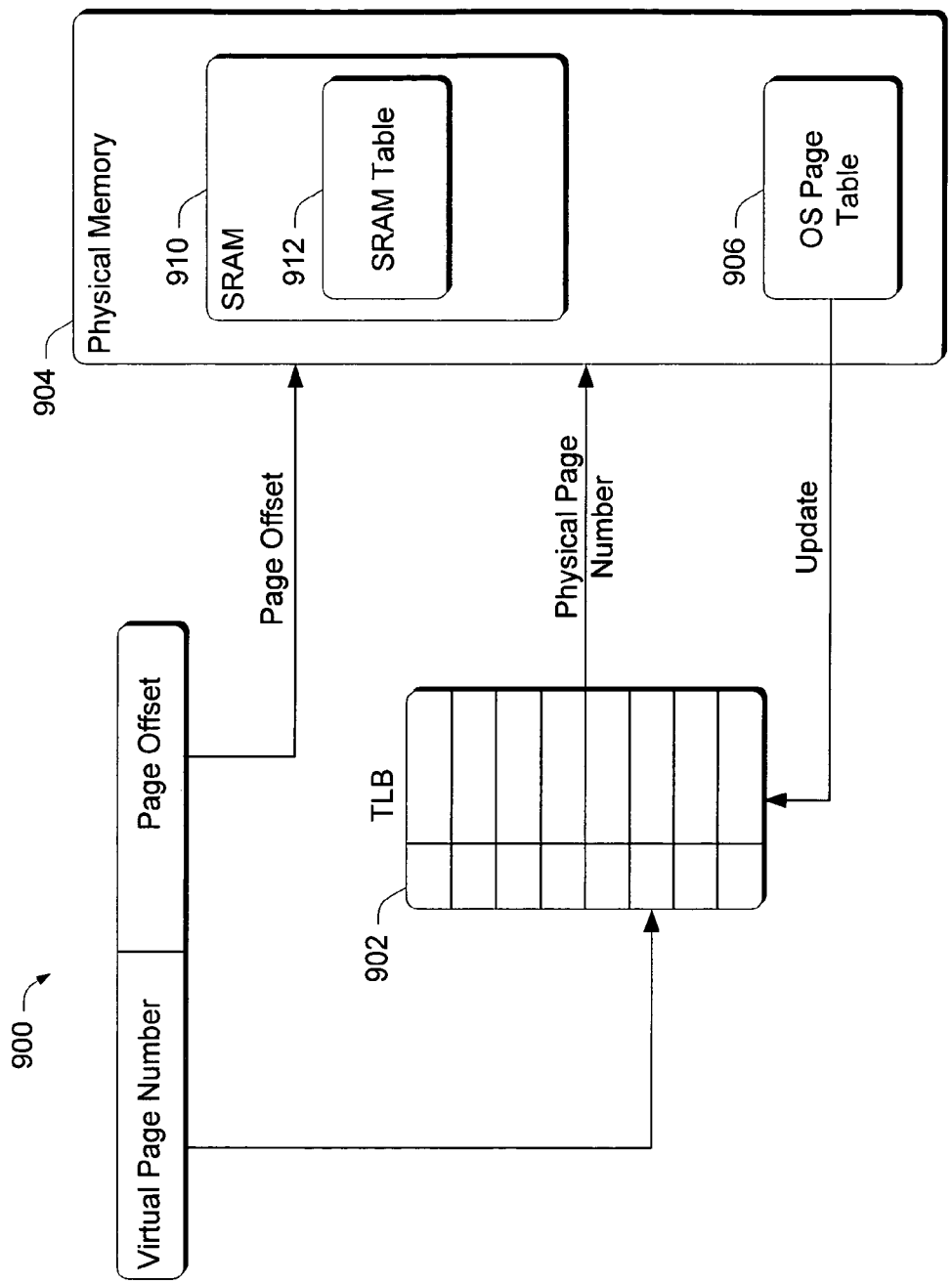
FIG. 9 is a block diagram that illustrates aspects of but one exemplary virtual addressing system.

To understand and appreciate concepts and the workings of an exemplary virtual memory system, consider FIG. 9.

Many modern computer systems, and indeed automotive computing systems of the type described above run multiple concurrent tasks or processes, each with its own address space. It would be expensive to dedicate a full complement of memory to each task, especially since many tasks use only a small part of their address spaces. Rather, virtual memory is used to give each process the appearance of a full address space. This allows a program to run on what appears to be a large, contiguous, physical-memory address space dedicated entirely to the program. In reality, however, the available physical memory in a virtual memory system is shared between multiple programs or processes. The memory that appears to be large and contiguous is actually smaller and fragmented between multiple programs. Each program accesses memory through virtual addresses, which are translated by special hardware and/or software to physical addresses.

Rather than attempting to maintain a mapping for each possible virtual address, virtual memory systems divide virtual and physical memory into blocks. In many systems, these blocks are fixed in size and are referred to as "pages". The addresses within an individual page can all have identical uppermost bits. Thus, a memory address is the concatenation of a page number, corresponding to the uppermost bits of the address, and a page offset, corresponding to the lower bits of the address.

A data structure is typically maintained in physical memory to translate from virtual page numbers to physical page frames. This data structure usually takes the form of a page table. A page table is indexed by virtual page number, and it generally has a number of entries equal to the number of pages in the virtual address space. That is, the page table keeps track of every virtual address that has been allocated in the system and provides a mapping to a physical location.

Virtual-to-physical address translation can consume significant overhead, since every data access requires first accessing the page table to obtain a physical address and then accessing the data itself. To reduce address translation time, computers can use a specialized hardware cache that is dedicated to translations. This cache is referred to as a translation lookaside buffer (TLB). A TLB typically has a small, fixed number of entries. The entries correspond to recently translated virtual pages numbers or addresses. The TLB can be direct-mapped, set associative, or fully associative.

FIG. 9 shows an exemplary virtual memory system using a TLB 902 and a page table 906. A process typically generates a virtual address 900 comprising a virtual page number and a page offset. The page number portion of the virtual address is used to index a TLB 902. Assuming that the TLB contains an entry corresponding to the virtual page number (a situation referred to as a TLB "hit"), the TLB produces a physical page number. The page offset portion of virtual address 900 is concatenated with the physical page number from the TLB, resulting in a full physical address for accessing physical memory 904. If the correct entry is not present in TLB 902 (a situation referred to as a TLB "miss"), an initial reference is made to page table 906 to update TLB 902.

A TLB miss thus initiates its own memory reference that could in many cases be the source of another TLB miss, creating the potential for an endless loop. To prevent this, the page table is typically stored in an "unmapped" portion of physical memory that is addressed directly by its physical addresses rather than by virtual addresses.

In order to be able to page in object store pages on demand, to periodically write object store pages out to a non-volatile medium (such as SRAM) just before they are "dirtied" (i.e. written to), as well as to flush dirty pages to a non-volatile medium (such as flash), the location of each object store page is tracked. Furthermore, this location information is available across power-on boots. Because the above-described battery-backed SRAM never loses power, and because it is easily readable and writeable, it is a desirable choice to maintain object store pages and page table information. The software portion the described embodiments can also be extended to use ordinary DRAM, instead of SRAM, and to store the page tracking table in FLASH. This, however, introduces more risk of data loss, and a guaranteed flash right time must be reserved with large enough capacitance, in order to allow the DRAM and page tracking table to be written to FLASH in the event of power loss.

Figure 10:
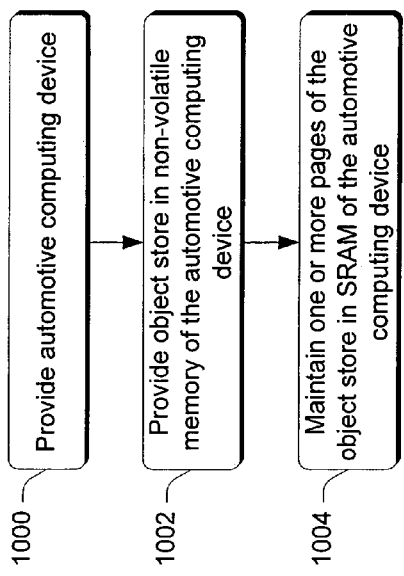
FIG. 10 is a flow diagram that describes steps in a method in accordance with one described embodiment.

FIG. 10 is a flow diagram that describes steps in a method in accordance with one embodiment. The method is desirably implemented in software in conjunction with an automotive computing device.

Step 1000 provides an automotive computing device. An exemplary automotive computing device is described above. Step 1002 provides an object store in non-volatile memory of the automotive computing device. In one implementation, the non-volatile memory comprises flash memory, although any suitable non-volatile memory will suffice. Step 1004 maintains one or more pages of the object store in one or more SRAMs of the computing device. Maintenance of the object store pages, as well as management thereof can advantageously take place utilizing principles of virtual addressing. One specific virtual addressing system was described above, although any suitable virtual addressing system can be utilized.

Two primary goals of the described embodiments are to implement methods to reduce boot up time by demand paging the object store, and to implement an extremely fast shut down without data loss. The first goal is discussed in more detail below in a section entitled "Fast Boot". The second goal is met by performing a periodic flush of object store pages from DRAM to non-volatile memory (flash or battery-backed SRAM). Both these two goals share a core characteristic—that the object store can be paged between the various memory media in the system. In paging the object store it is useful for the software to track (1) which pages need to be paged, (2) when they need to be paged, and (3) where these pages are located. Each of these items is specifically discussed in the sections immediately below.

Determining Which Pages Need to Be Paged in

In order to track which object store pages need to be paged in, pages that correspond to the object store are first identified. In the described embodiment, the object store is initially represented as a linked-list containing physical DRAM address pointers to pages of object store data. Software uses these linked-list addresses to determine the physical addresses of the object store. Furthermore, because these are physical addresses, rather than virtual addresses, they are not subject to change due to memory management tasks such as heap compaction. In accordance with the described embodiment, these physical addresses are placed within a table in battery-backed SRAM so that the object store can be tracked by physical addresses across power cycles. As an example, consider again FIG. 9 which shows SRAM 910 as containing an SRAM object store table 912. Note that although the SRAM object store tracks the object store pages' physical addresses, the operating system itself manages the object store by using corresponding virtual addresses.

Determining When Pages Need to Be Paged in

In the illustrated and described embodiment, object store pages are paged from flash memory into RAM (either SRAM or DRAM) whenever they are accessed. This is known as "demand-paging". The described embodiment takes advantage of the fact that the system's Central Processing Unit (CPU) contains a translation look-aside buffer (TLB), which consists of two parts: a key and a value. Put in the simplest of terms, each key is a virtual address while each value is the corresponding physical address bundled with some additional flags, such as a dirty flag and permission access flags. When a virtual address access is attempted (e.g. a write to a virtual address), the CPU will attempt to use this address as a key into the TLB. If the key is not found, the CPU will generate an exception called a TLB Miss Error or "miss" as mentioned above.

The described embodiment uses this TLB Miss Error exception to its advantage in the following way: in the TLB Miss Error exception handling code, if an access is made to an object store page, the software checks to see whether the object store page is already in RAM or not. If the object store page is not in RAM, it is paged in from flash memory. Furthermore, the TLB is updated to contain a new mapping for the virtual address of the object store page. Note that a mapping is added for all TLB misses, not just for those corresponding to object store page accesses. Additionally, when a TLB is full at the time of a TLB miss, at least one TLB entry is flushed to make room for a new one. Since a TLB is very small, a flush can occur frequently.

Determining Where Pages are Located

In general, the Operating System (OS) maintains all of the mappings between virtual and physical addresses in a software structure known as the page table which is described above in connection with FIG. 9. This OS structure is able to map every valid virtual address. A subset of these mappings is also kept in the CPU's hardware cache in the form of the TLB as mentioned above. The TLB contains the most recently translated virtual page numbers. In the illustrated and described embodiment, an additional table of object store pages referred to as the "SRAM table" or the "SRAM object store page table" (i.e. table 912) is also created and maintained in SRAM. Since the SRAM is battery-backed as described above, in the event of an abrupt power loss, all of the location data (i.e. virtual address to physical location mappings) for the object store pages are preserved and maintained in SRAM.

SRAM Object Store Page Table

The following discussion describes a specific implementation of an SRAM Object Store Page Table and is not intended to limit application of the claimed subject matter. Accordingly, departures from the described implementation can be made without departing from the spirit and scope of the claimed subject matter.

In the illustrated and described embodiment, the object store is assumed to have a maximum size of 16 Mbytes. At this size, 4K object store age table entries (i.e. 16 Mbytes/4 Kbytes pages) can track every page of the object store. These entries can be bundled together, e.g. as an array which is ordered by physical address.

The illustrated and described embodiment uses a flag in SRAM to tag the SRAM Object Store Page Table as "valid" or "invalid". On a first-time "cold boot", this flag is marked invalid since the table has not yet been created. Since the first-time cold boot value of SRAM is undefined, a simple 1 or 0 flag for valid and invalid, respectively, is not sufficient. Instead, the flag should be a distinct value, e.g. 0xCAF-ECAFE. Thus, the described embodiment reserves 1 DWORD in SRAM for a validity flag.

The illustrated and described embodiment uses the second half of the HRP 32 Mbytes flash memory for object store storage. With a 512 K flash block size, there are 16 bytes/512 Kbytes=32 blocks ($2^5$) available for object store storage. Thus, five bits are used to track the last free block used for wear leveling and compaction. Wear leveling and compaction is discussed below in more detail.

In the specifically described implementation, the number of bits required to track the last page written to flash is the same number (5 bits) required to track the last free flash block, as described above. Additionally, there are 512 Kbytes per block/4 Kbytes per page or 128 pages per block. Seven bits can access $2^7$=128 pages; hence, 7 bits are needed to access a page within a block.

The described implementation tracks the state of each page of flash as either free, erased, or in use (2 bits per page can represent these 3 states). Since there are (128 pages/block)*32 blocks available, there are 32*128 total pages available. Since each page requires 2 bits, the described implementation uses (32*128*2)/8 bytes, or 1024 bytes (i.e. 256 DWORDS) to track the status of each page within a block.

It will be appreciated and understood that the number of bits required to track the number of object stores pages in SRAM is dependent on the amount of SRAM available, as well as the amount of space taken by SRAM data other than object store pages. One hardware design allows for one or two parts of 128 Kbytes of SRAM to be used. Investigation of a 512 Kbytes part is currently underway as well. With two 512 Kbytes parts, one part can be used as a 512 Kbytes buffer used to build up a flash block of data (the HRP's flash block size is 512 K). From a performance standpoint, this is ideal because an entire flash block can be written in one continuous operation which reduces overhead. However, many OEMs are building very cost sensitive products; thus, they may be willing to sacrifice some performance for a lower cost solution involving a single 128 Kbyte or 256 Kbyte of SRAM.

Assume, for example, that only 128 Kbytes of SRAM is used, and that 2 Kbytes are reserved for tracking object store pages, flash blocks, etc. This allows 126 Kbytes/4 K bytes per page, or 31 pages of the object store in SRAM. Thus, five bits ($2^5$ =32) can be used to track these SRAM object store pages.

Assuming a constant offset from the beginning of SRAM to the location at which the first object store page is written to SRAM, we would only need to reserve enough bits to access the maximum number of object store pages in SRAM. As pointed out above, this is dependent on the amount of SRAM available. We can assume, however, that the number of bits necessary is the same number needed to track the number of object store pages currently stored in SRAM—5 bits.

The SRAM information can be represented as a structure an example of which is given below:

```
typedef struct tagSramHeader{
// if the table is valid, the following will be a specific magic number
    DWORD dwValidityFlag;
// last free block used for wear-leveling and compaction
    DWORD LastFreeFlashBlock : 5;
// index of flash block containing last page written to flash
    DWORD BlockforLastFlashPageWritten : 5;
// last page written to flash
    DWORD PageLastWritten : 7;
// number of object store pages in sram
    DWORD NumberSramObjectStorePages : 6;
```

-continued

```
// page number to write next object store page in sram
    DWORD IndexToWriteNextSramPage : 6
    DWORD unused : 3;          // unused
// track free, erased, and erased blocks in flash
    DWORD FlashBlockInfo[256];
} SramHeader;
```

SRAM Object Store Page Table Entry

Figure 11:
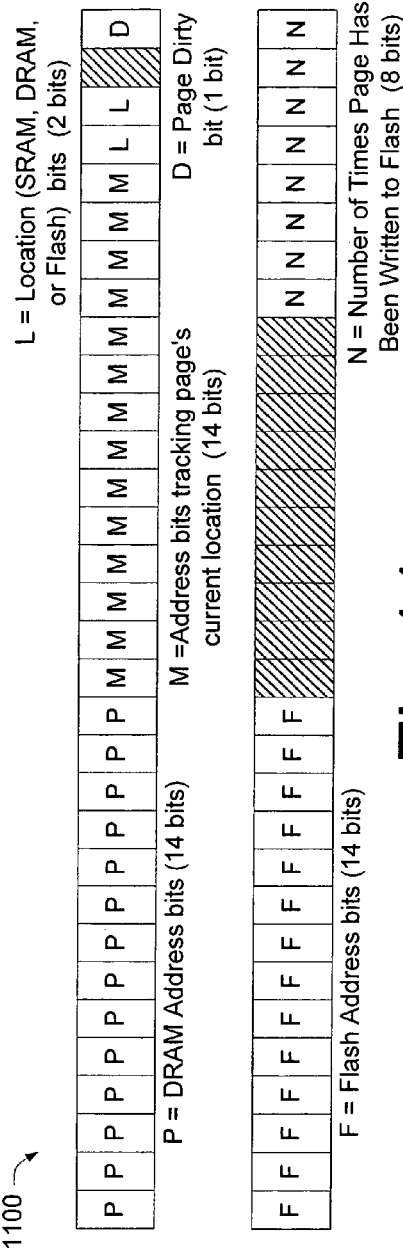
FIG. 11 is a diagram that illustrates an exemplary object store page table entry.

Within the SRAM Object Store Page Table are individual page table entries. One specific exemplary SRAM Object Store Page Table Entry is shown in FIG. 11 at 1100. The "P" designations indicate bits that define a physical address, the "M" designations indicate bits that define a flash or SRAM address, the "L" designations indicate bits that indicate a location (i.e. DRAM, SRAM, or flash), the "D" designation indicates a bit that defines whether a page is dirty or not, the "N" designation indicates bits that define the number of times a page has been written to flash, and the "F" designation indicates bits that define a flash address.

On the very first-time boot of the automotive computing device (or after a reset which causes a cold boot), the system will go through a 5–10 second cold boot. Since this type of boot normally happens once in the lifetime of the device, it is assumed to be an acceptable specification, especially considering that it can be performed on the device before it is shipped to the customer.

In addition to general initialization, the described embodiment makes a copy of the object store in flash memory, and creates the corresponding SRAM Object Store Page Table in SRAM. This table is initialized with entries indicating that the pages are initially in flash memory with read-only access.

The described object store page table entries provide the information specified in the table below using the "L" bits.

| L bits | Meaning |
| --- | --- |
| 00 | Page resides in DRAM, and there isn't a copy of it in flash yet. |
| 01 | Page resides in DRAM and there is a copy of it in flash. |
| 10 | Page resides in SRAM. |
| 11 | Page resides in flash. |

P Bits

The "P" bits are used for tracking the start of the page relative to the starting physical address of DRAM. The offset of the start of the page relative to the starting physical address of DRAM corresponds to the fixed physical address offset at which the OS thinks the page is located in DRAM; because this is a fixed address, this address will not change when the page is moved from one physical medium to another.

With a 4 Kbytes page size, $2^2*2^{10}=2^{12}$ bytes can be accessed per page. Thus, the lower 12 bits of an address reference the offset within a page. Since the described table tracks starting page addresses, we can eliminate 12 bits of page offset from our 32-bit address.

Also, the upper six bits of our addresses are always the same for a specific physical medium; e.g. the upper six bits of addresses in flash are always 101000 binary. So, we can eliminate these upper 6 bits from the 32-bit address as well. This results in a 32−12−6=14 bit address; thus 14 bits are used to track the start of the page relative to the starting physical address of DRAM.

M Bits

The "M" bits are used for tracking the start of the page relative to the starting physical address within a physical medium. The offset of the start of the page relative to the starting physical address in SRAM, DRAM, or flash corresponds to the actual location of the page at any given time. Note that in the DRAM case, the P offset bits and the M offset bits are the same. (Note that "M" is a pneumonic for "moveable".) When an object store page is moved from one physical medium to another, the "M" offset is changed to reflect the new physical location of the page. Using the same calculation as described in the P bits description above, 14 bits are necessary for this entry.

F Bits

The "F" bits are used to track the offset of the start of the page relative to the starting physical address in flash. The "F" bits are used in two scenarios: (1) When a read-only page is moved to DRAM, a copy of the page is still kept in flash and its location in flash is tracked. The reason for tracking the page in both flash and in DRAM is that if power is lost, the read-only page in DRAM will be lost; (2) When a page is copied from SRAM to flash in order to make space for new pages in SRAM, the "F" bits are set to the starting address of the page in flash in order to track the page's new location in flash. Using the same calculation as described in the P bits description above, 14 bits are necessary for this entry.

D Bits

The "D" bit tracks whether a page is dirty (i.e. written to) or not. Only one bit is needed per object store page table entry to track whether the corresponding page is dirty or not.

N Bits

The "N" bits track the number of times a page has been written to flash. A count of the number of times the page has been written to flash can be used to determine which pages to flush back to flash when flushing becomes necessary. Tentatively, one byte per table entry is reserved.

Reserved Bits

The number of bits necessary for each page table entry may need to be modified in the future; we may also want to reserve additional bits for future expansion. Accordingly, the cross hatched bits correspond to those that are reserved for future use.

OEM Adaptability

As noted above, the described embodiment provides an extensible platform upon which OEMs can build. Since the amount of physical memory present in a device is OEM specific, the data and bit fields described above in the "Object Store Page Table" and "Object Store Page Table Entries" sections can vary in size. Also, some parameters, such as page size, are CPU dependent. Because of this inherent variability, the information can be under OEM control.

As described below, access to these OEM-specific data can occur during "TLB Miss" and "Write Exception" handling. So called "hooks" can be provided to the corresponding OS exception handlers to call OEM exception handlers to access the OEM-specific data. Additionally, OS functions can be implemented to modify the OS page table and TLB; the OEM exception handlers can simply pass arguments, such as a new physical address or a page attribute, to these functions.

Booting With An Existing Configuration Scenario

As mentioned above, after the first power-on cold boot, all subsequent boots restore the minimum number of object store pages so that the operating system thinks it is warm booting. Since every access to a page currently not represented in the TLB will cause a TLB miss exception, the system is able to "trap" every first attempted access to object store pages stored in flash and SRAM.

It is important to note that this particular described embodiment provides that the OS exception handlers for write access and TLB miss (for a read or a write) will not be modified, with the exception of having them also call an OEM exception handler (referred to as "hooking") and to handle return values from these hooked OEM handlers.

On each subsequent power-up boot, the SRAM Object Store Page Table is processed or "walked" to change all references to pages in DRAM to pages in flash, since the contents of DRAM were lost when the power went off. For these DRAM entries, the F bit values (the offset of the page in flash) are copied into the M bit values, which specify the offset of the object store page in SRAM, DRAM, or in flash. Also, the L bits are changed to indicate that the page is in flash. When a TLB miss on read or on write exception occurs, an OEM TLB exception handler can be called from within the OS exception handler. One of the parameters passed to this handler can be the physical address corresponding to the virtual address of the TLB miss—this data is fetched from the operating system's page table which maps the virtual address to a physical address via a series of table indirections. This physical address corresponds to the location at which the OS thinks the page resides in DRAM. In the SRAM Object Store Page Table Entry, this value corresponds to the "M" bits address—the offset of the page within SRAM, DRAM, or flash (and will be referred to the M address below).

The handler then determines if the physical address fetched from the OS page table corresponds to an object store page. This is more easily done if the SRAM's Object Store Page Table is sorted with respect to the M address; if so, the physical address only needs to be compared with the first and last M addresses in the Object Store Page.

If the physical address is not in range, the fault does not correspond to an object store page, so the handler will simply return. However, if it is in range, the handler will take appropriate action, as outlined below, as well as in the Table of FIGS. 12A and 12B entitled "Handling Object Store Page Exception".

TLB Miss Error Exceptions

Attempting to access (i.e. read and/or write) a page that is not currently mapped in the TLB results in a TLB Miss Error Exception. In the described embodiment, the OS TLB Miss Error Exception handler is modified to call an OEM exception handler to give it an opportunity to handle this exception.

If the page being accessed is part of the object store, the OEM handler is responsible for copying the page from flash into either DRAM or SRAM. If the exception occurred because of an attempted read access, the page will be copied to DRAM; if it occurred because of an attempted write access the page will copied to SRAM. The reasoning behind this is that since a "read-only" page cannot be modified, it will never become dirty. In the event of a power loss, no changes to the page can therefore be lost. In addition, the SRAM Object Store Page Table is modified to reflect the new location of the page (i.e. L and M bits) as well as the dirty bit (D bit). Note that the dirty bit will be set to dirty on a TLB Miss Error Write Exception because the page will be dirty as soon as the write to it completes.

If the page is not part of the object store, the OEM exception handler can return to the OS exception handler with an indication that it did not process the exception. The OS exception handler can then process this exception normally—i.e. it will update the TLB with information for page corresponding to the attempted access.

Write Exceptions

Attempting to write-access an object store page in flash, or a read-only object store page in DRAM will result in a write exception. The OS Write Exception handler can be modified to call an OEM exception handler to give it an opportunity to handle this exception. If this page is part of the object store, this handler will be responsible for copying the page into SRAM for modification, as well as modifying the corresponding entries in the SRAM Object Store Page Table. These modifications include modifying the M bits to reference the page now in SRAM, the L bits to indicate the page now resides in SRAM, and the D bit to indicate that the page is dirty (i.e. it is about to be written to).

Also, the OEM exception handler is responsible for calling OS functions to modify the corresponding OS page table and TLB. These OS functions can be written within the OS layer and exported in the kernel. The corresponding OS page table and TLB entries are then modified to contain the page's new physical address, and to reflect that the page is now writeable.

Summary of Handling Object Store Page Exceptions

FIGS. 12A and 12B contains a table that generally summarizes the processing that takes place for handling object store page exceptions in accordance with the described embodiment. The explanation of the table is believed to be fairly straight forward and, for the sake of brevity, is not repeated here.

Managing the SRAM

In the illustrated and described embodiment, the battery-backed SRAM is used, in the context of an automobile computing device, essentially as a write cache for the purpose of preserving dirty pages in the event of a power loss. The SRAM also includes state information which is saved in the SRAM Object Store Page Table. Accordingly, in the event of a power loss, all of the system's dirty pages as well as the locations of all of the Object Store pages are known. One goal of the process described above is to avoid having to do any copying in the event of a power loss. Essentially, then, as the system is operating, the SRAM is collecting "dirty" pages to avoid any copying upon a power failure.

Consider, however, that in the described embodiment the SRAM is considerably smaller than the Object Store. For example, if you have 4 Mb of pages that need to be written to SRAM and only a 128K SRAM, the SRAM is going to be filled up and unavailable.

In accordance with one embodiment, the SRAM or at least portions of the SRAM are periodically flushed to the flash memory to make room for new pages. Any suitable techniques can be used to periodically flush the SRAM. For example, a first in and first-out (FIFO) technique might be used. Such technique is not, however, a good choice because it does not take into consideration that some pages may be written to much more frequently than others. For example, an object store page with registry data would most likely be written to much less frequently than a page of the file system. Recall that this can be an issue because we want to minimize the number or frequency of writes to the flash so that the flash is not worn out.

In accordance with the described embodiment, and in light of the desire to minimize the number of writes to flash, the frequency of page use is tracked by storing a "write-to-flash" count within the object store page table. Accordingly, pages that are least frequently written to flash will be flushed to flash first.

Figure 13:
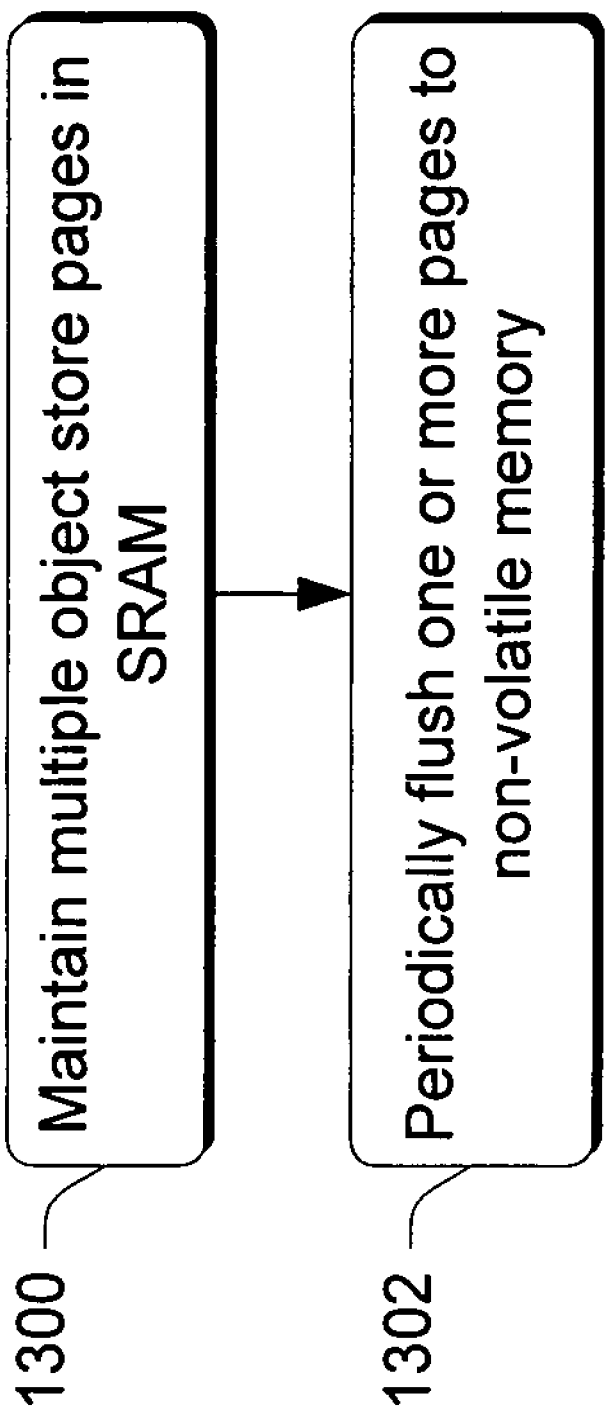
FIG. 13 is a flow diagram that describes steps in a method in accordance with one described embodiment.

FIG. 13 is a flow diagram that describes steps in an SRAM management method in accordance with the described embodiment. The steps are desirably implemented in software, but can be implemented in any suitable hardware, software, firmware, or combination thereof.

Step 1300 maintains multiple object store pages in SRAM. These pages can be provided into the SRAM as described above. Step 1302 periodically flushes one or more object store pages to non-volatile memory to make room for additional object store pages.

Determining When To Flush SRAM To Flash

One approach to determining when to periodically flush SRAM pages to flash is to flush the pages at either low, normal, or very high thread priorities, based on how many free SRAM pages there currently are. For example, a low priority thread (such as an idle time thread) can flush the SRAM when there are less than x pages of free SRAM in which to write object store pages. A normal priority thread can flush the SRAM when there are less than y pages of free SRAM where y<x. Finally, a high priority thread can flush the SRAM when there are less than z pages (e.g. one page) of free SRAM, where z<<y<x. The object is to minimize the writing done to flash and leave dirty pages in SRAM as long as possible. This prevents over usage problems with the flash memory and minimizes the amount of time spent copying pages from flash into ram and visa versa.

Managing Flash Memory

An erased flash memory block consists of a series of '1's. Writing a 0 to any bit in the block requires the entire block to be erased. It takes a non-trivial amount of time to put the flash in erase mode and then to erase it. Also, the larger the block size you have, the longer it takes to erase a block.

Against this backdrop, two important issues are addressed when managing flash: compaction and wear leveling.

Compaction

In order to move one or more pages to flash, at least one block of erased flash needs to be available. This is because, unlike RAM, you cannot write to a portion of a block without erasing the entire block. If every block of flash had at least one page of object store data in it, you would need to erase one block before writing the new page. In the process of erasing the block, you would wipe out the contents of the page that was already in the block.

Figure 14:
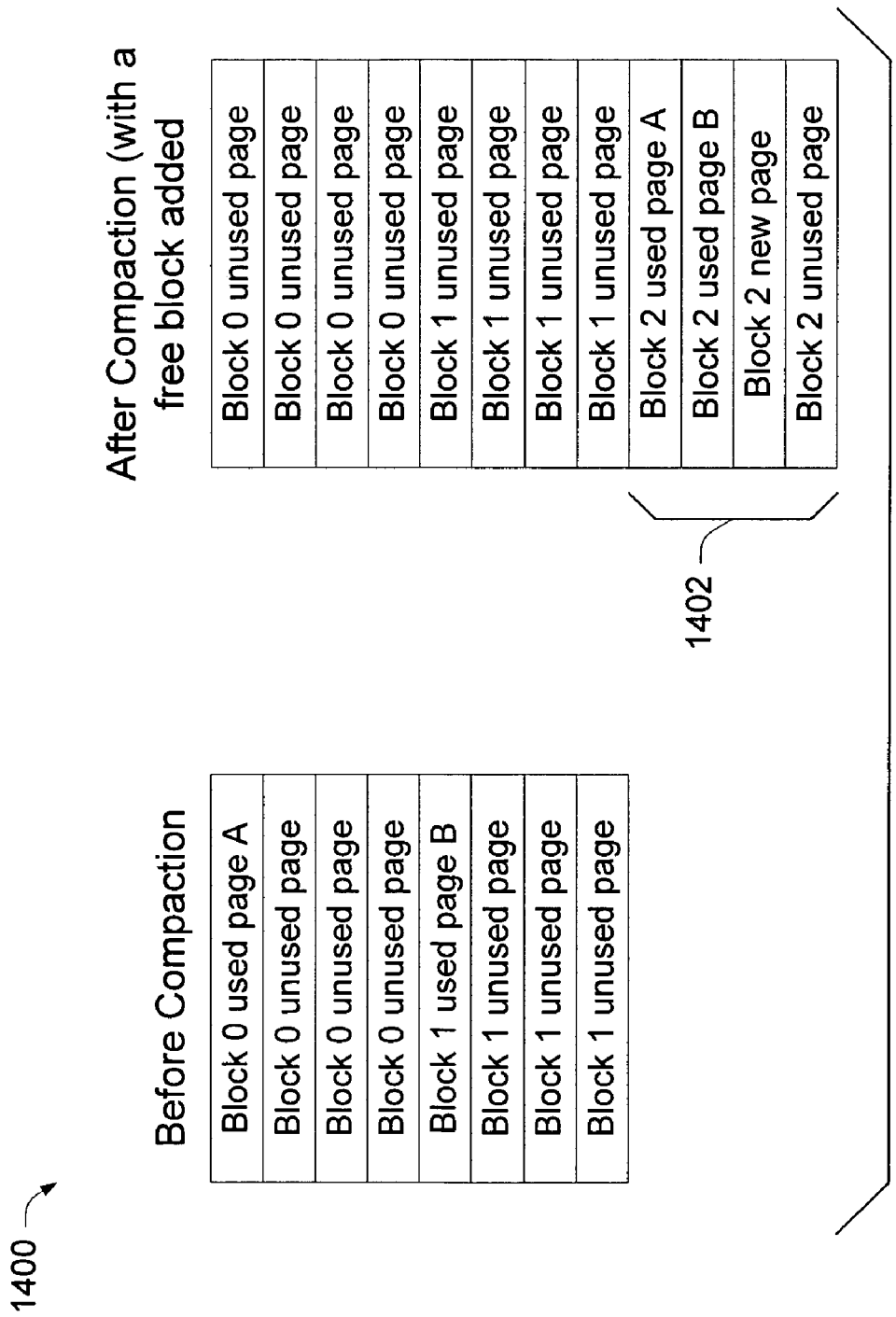
FIG. 14 is a diagram that is useful in understanding compaction aspects of the described embodiments.

FIG. 14 shows a flash system 1400 with two blocks (Block 0 and Block 1) and a block size equal to 4 * page size. Further, each block has one page of data in it. In order to write a new page to Block 0, the entire block first needs to be erased, meaning that the used page A would be lost. In order to prevent the page loss, at least one free block needs to be available to use for compaction. Thus, in accordance with the described embodiment, one block is reserved for compaction. For our example, page A, page B, and the new page are copied to an unused, erased block 2 as shown at 1402. After the copy, blocks 0 and 1 are erased to prepare for subsequent writes.

Figure 15:
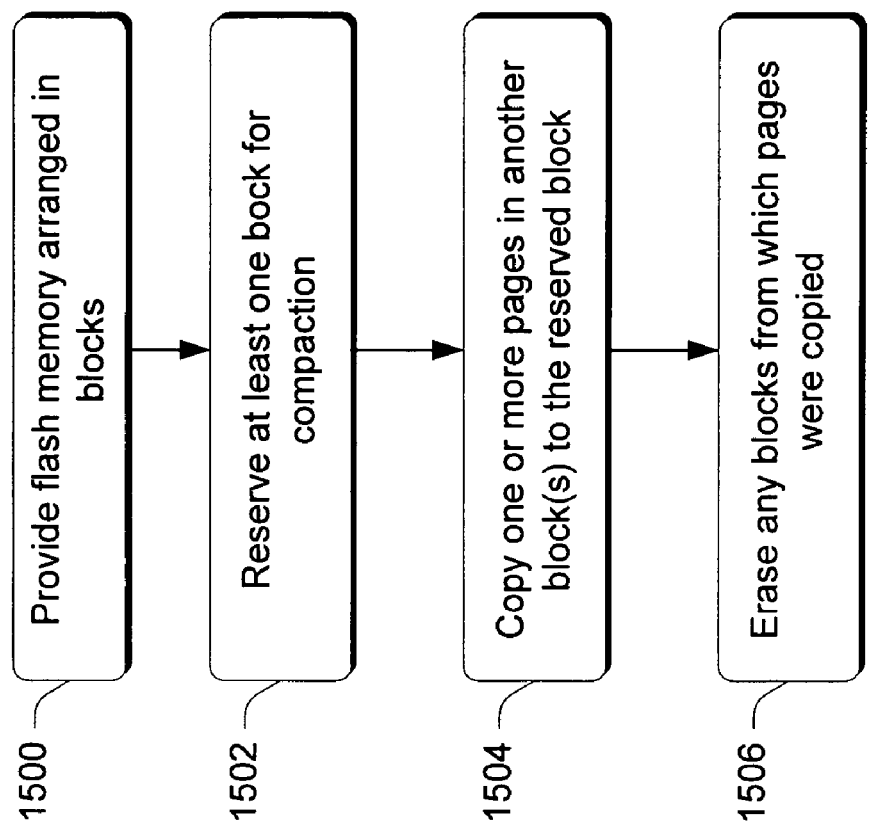
FIG. 15 is a flow diagram that describes steps in a method in accordance with one described embodiment.

FIG. 15 is a flow diagram that describes steps in a compaction method in accordance with the described embodiment. The steps are desirably implemented in software, but can be implemented in any suitable hardware, software, firmware, or combination thereof.

Step 1500 provides flash memory arranged in blocks. Step 1502 reserves at least one block for compaction. Step 1504 copies one or more pages in one or more other blocks to the reserved block. Step 1506 erases any blocks from which pages were copied to prepare the blocks for subsequent writes.

Wear-Leveling

Flash memory can typically withstand 100,000 to 1 million writes before it fails. Depending on the amount of SRAM available, as well as the effectiveness of the algorithm used to determine which SRAM pages to flush to flash, the SRAM may or may not need to be wear-leveled.

Wear leveling requires using a different free block for each successive compaction. This is because if the same block in flash is always used as the free block, eventually this block will wear out. For the $0^{th}$ compaction, block 0 can be used as the free block in which to copy pages; for the $n^{th}$ compaction, block n could be used. Accordingly, a different measure can be used to determine which block to use.

A variable in SRAM can track the current free block and the offset of the last written page since this value needs to persist across power-off boots. In addition, the next page written to flash can be written to a block at a physical address always greater than address of the previous page write.

Figure 16:
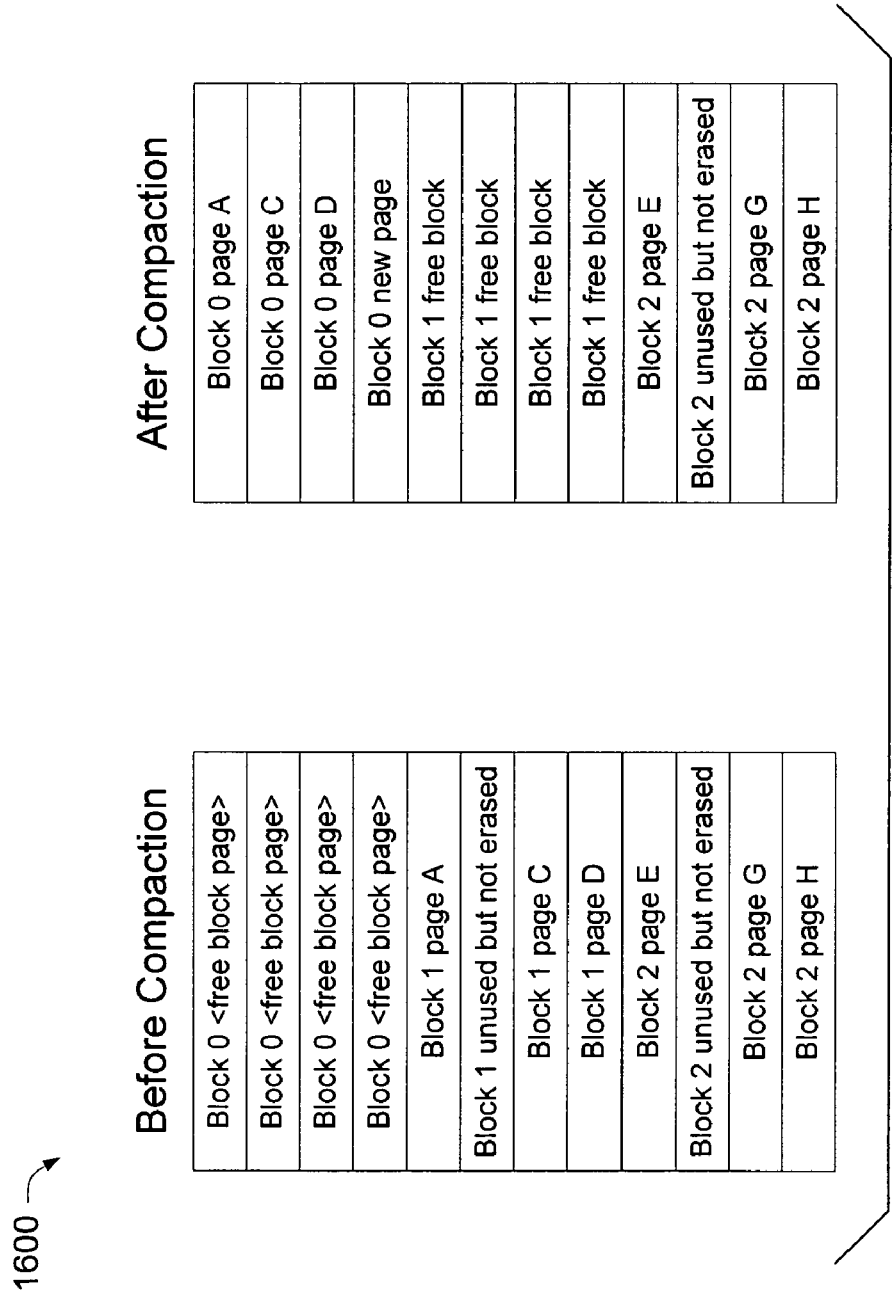
FIG. 16 is a diagram that is useful in understanding wear-leveling aspects of the described embodiments.

As an example, consider FIG. 16 which shows a flash system 1600 with 3 blocks of 4 pages each. Initially, block 0 is reserved as the free block for compaction. Blocks 1 and 2 contain 4 used pages each. However, after some time later, the second page of each block is paged to SRAM. The next page write to flash cannot be done to blocks 1 and 2 because these blocks need to be erased before the next write (see the "Before Compaction" diagram on the left). In order to prepare for the next page write, flash memory needs to be compacted. Since block 0 is the free block for compaction, pages will be written to it after block 0 is erased (or it may have been previously erased during idle time). Since we are also wear leveling while compacting, the goal is to reserve block 1 (the next consecutive block after block 0) as our next free block. This means that we must move all used pages currently in block 1 to block 0 (See the "After Compaction" diagram on the right).

After all of the pages in block 1 are moved to block 0, block 1 can be erased so that it can be used as the next block to which pages are moved.

Fast Boot

One design goal in the presently-described automotive computing device is to be able to boot the device from a zero power state, i.e. get the device up and running, as fast as possible. In the past, one solution to the zero power scenario was to take the entire object store and maintain it in flash memory. On boot up, the entire object store would then be read into DRAM. This process involved copying every single page in the object store, whether the page was needed or not, and could take on the order of 5 seconds or more. In accordance with the described embodiment, the only pages of the object store that are copied into RAM are pages that are actually needed for boot up. That is, the necessary pages are paged into RAM from flash memory as they are needed during a boot from a zero power state. These necessary pages can include, without limitation, pages that are used by the file system during its initialization. These can include pages that contain the file system's structural data, FAT tables, and the like. As subsequent pages from the object store are needed, they are paged in. Thus, in the "fast boot" scenario, pages from flash memory are copied into RAM as they are being used. This reduces the number of pages that are read in on boot up from (a) all of the pages in the entire object store to (b) just the pages that are needed for booting. It will be appreciated that the specific pages that are needed by any specific system are not particularly relevant to this discussion, as such pages can change as between systems.

Figure 17:
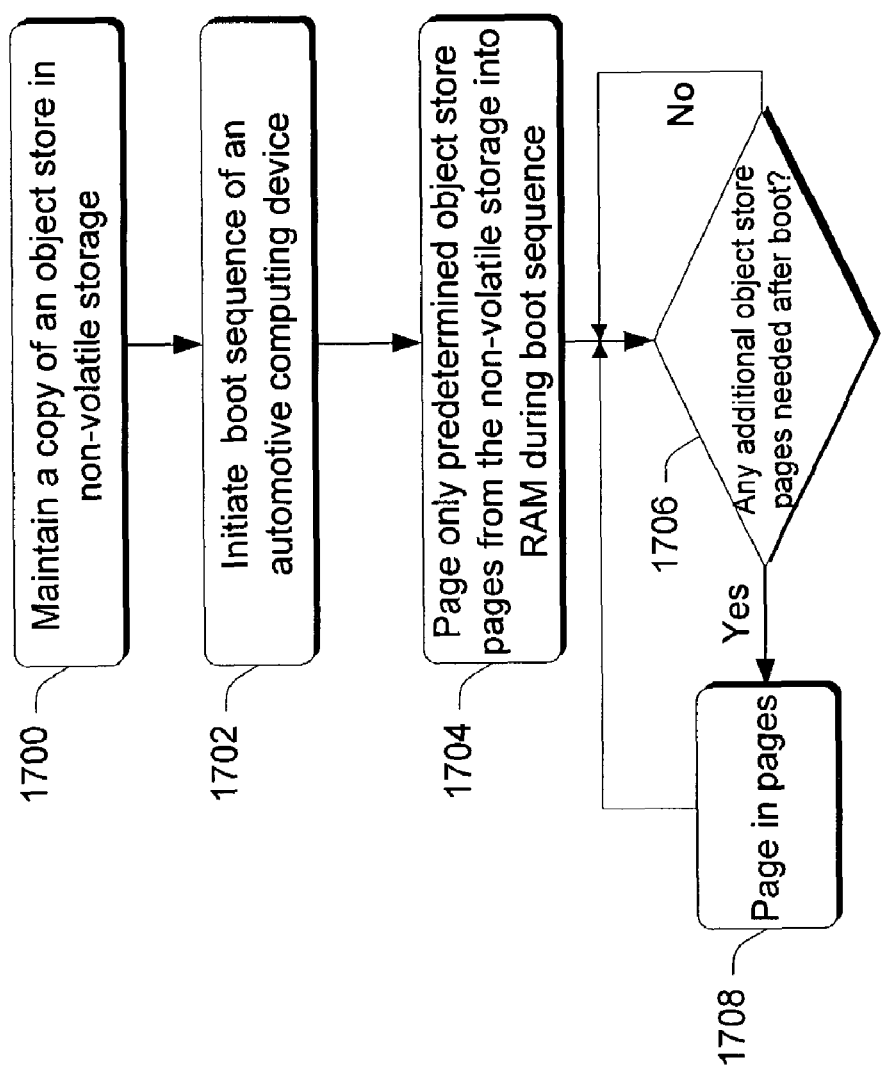
FIG. 17 is a flow diagram that describes steps in a method in accordance with one described embodiment.

FIG. 17 is a flow diagram that describes steps in a fast boot method in accordance with the described embodiment. In the illustrated example, the method is implemented in software that is executing on an automotive computing device such as the devices described above. Step 1700 maintains a copy of an object store in non-volatile storage. The non-volatile storage can be any suitable non-volatile storage that comprises part of the vehicle's computing device. In one implementation, the non-volatile storage comprises flash memory. The object store copy is maintained in the non-volatile storage from a previous boot of the system. Step 1702 initiates a boot sequence of the automotive computing device. Such sequence is initiated when, for example, power is returned or supplied to the system, i.e. when a vehicle carrying the computing device is started or has power restored. Step 1704 pages, during the boot sequence, only predetermined object store pages from the non-volatile storage into RAM. Desirably, this results in less than all of the object store pages being paged in during boot up. This enables the computing device to boot quickly. Step 1706 determines, after the boot sequence, whether any additional object store pages are needed. If any pages are needed, step 1708 pages them in as described above.

In one implementation that utilizes an SRAM as described above, there is software code that recognizes whether the SRAM object store page table is valid, e.g. the code uses a signature in a known manner. The SRAM object store page table contains information that describes what has been done with all of the DRAM file system pages. That is, with respect to all of the object store pages, and particularly those that were contained in DRAM before the last power down, the SRAM object store page table contains information that describes these pages' locations. When a boot up is initiated, software code processes the SRAM object store page table and marks all of the object store pages that were indicated as residing in DRAM as not being in DRAM any longer. Note that these pages are still in the flash memory because presumably, they were "read only" pages copies of which are maintained in flash memory.

When the operating system tries to reference a page that it believes should be in DRAM, a TLB miss exception is generated. Recall that TLB miss exceptions are generated the first time a page is accessed since the TLB does not yet contain a mapping between the virtual address of the page and the physical address at which the page is actually located. In accordance with the described embodiment, the TLB miss exception is intercepted before the operating system has a chance to process it. Software code then takes the virtual address of the page and uses it as a key into the OS page table. This is done to fetch the physical address (in RAM) at which the operating system believes the page is located. The software code then compares this physical address with the addresses in the SRAM object store page table to ascertain whether the page comprises part of the object store or not. If the page is part of the object store, the code ascertains the page's actual location by using the SRAM object store page table. Recall from the discussion above that various bits are used to track the current location of a page as being in either SRAM, DRAM or flash. If the page is currently in SRAM, an adjustment is made to the OS page table to change the page's physical DRAM address to the page's actual SRAM address. In addition, the virtual and physical addresses of the page are entered in the TLB. If the page resides in flash memory, the page is copied (using the address stored in the SRAM object store page table) to DRAM or SRAM. The page is copied to SRAM if the page access is a write access, otherwise the page is copied to DRAM. If the page is copied to SRAM, adjustments are made to the SRAM object store page table, the OS page table, and the TLB to reflect the new location of the page.

As each subsequent page is used, it is copied to RAM (either DRAM or SRAM) using the TLB miss exception described above. This results in pages being paged in on demand. This in turn accelerates the booting of the computing device.

CONCLUSION

The above systems and methods provide cost-effective solutions to data loss problems caused by emergency power shut down in automotive computing devices. The solutions can greatly increase the lifetime of the automotive computing device so that it effectively has an expected lifetime that is greater than the anticipated product life. The particular battery-backed SRAM embodiments not only provide solutions that can use batteries that fall within automotive specifications, but ensure that consumers do not have to replace the backup batteries during the computing devices' product lifetime. In addition, the hardware and software of the described embodiments cooperate to ensure that critical system data is not lost in the event of a power loss. The inventive solutions enable power to be abruptly lost without jeopardizing any system-critical data. In addition, inventive techniques reduce the time that is required to boot the automotive computing device thereby enhancing the user's experience and meeting desired OEM limitations on desired boot times.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
an automotive computing device having a processor, volatile memory, non-volatile memory, and SRAM;
means for providing an object store for the computing device in the non-volatile memory;
means for maintaining one or more pages from the object store in the SRAM; and
means for providing pages from the SRAM into the non-volatile memory in a predetermined manner based upon a frequency that said pages are written to said non-volatile memory, wherein said frequency is tracked on a write count stored in an object store page table.

2. The system of claim 1, wherein said means for maintaining is configured to perform responsive to a detected power loss.

3. The system of claim 1 further comprising means for paging object store pages on demand into volatile memory.

4. The system of claim 1 further comprising means for writing one or more pages from volatile memory into SRAM.

5. The system of claim 4, wherein said means for writing is responsive to accessing a page for the purpose of writing to the page.

6. The system of claim 1 further comprising means for writing one or more pages from volatile memory into a DRAM buffer allocated for that purpose.

7. The system of claim 1, wherein said means for providing the object store comprises means for copying the object store into the non-volatile memory on an initial boot up of the device.

8. The system of claim 1, wherein the non-volatile memory comprises flash memory.

9. The system of claim 1 further comprising means for maintaining the object store page table in SRAM, the object store page table providing data associated with the location of object store pages.

10. The system of claim 9 further comprising means for updating the object store page table in SRAM whenever an object store page is moved from one medium to another.

11. The system of claim 1 further comprising means for maintaining the object store page table in DRAM, the object store page table providing data associated with the location of object store pages.

12. The system of claim 1 further comprising means for battery-backing the SRAM in the event of a power loss.

13. In an automotive computing device having non-volatile storage that can contain a system object store and DRAM that can receive object store pages, a system comprising:
means for providing one or more object store pages from the DRAM into an SRAM or separate DRAM buffer, comprising part of the automotive computing device; and
means for providing one or more pages from the SRAM or DRAM buffer into the non-volatile storage in a predetermined manner based upon a frequency that said pages are written to said non-volatile storage, wherein said frequency is tracked on a write count stored in an object store page table.

14. The system of claim 13, wherein said means for providing uses using virtual addressing techniques.

15. The system of claim 13 further comprising means for paging object store pages from the non-volatile storage into DRAM responsive to a page being accessed.

16. The system of claim 15, wherein the non-volatile storage comprises flash memory.

17. The system of claim 15, wherein said paging comprises determining whether a page that is attempted to be accessed is already in DRAM or SRAM, and if not in either, paging it in from the non-volatile memory.

18. The system of claim 17 further comprising means for updating a translation look-aside buffer to contain a new mapping for a virtual address of at least one page that has been paged in.

19. The system of claim 13 further comprising means for maintaining the object store page table in the SRAM, or a region of the DRAM buffer that can be backed up to non volatile memory on shutdown, the object store page table maintaining information associated with the location of object store pages.

20. The system of claim 19 further comprising means for updating one or more entries in the object store page table responsive to said acts of providing.

* * * * *